US012682690B2

(12) United States Patent
Arai et al.

(10) Patent No.: US 12,682,690 B2
(45) Date of Patent: Jul. 14, 2026

(54) INFORMATION PROCESSING METHOD AND INFORMATION PROCESSING SYSTEM

(71) Applicant: Panasonic Intellectual Property Corporation of America, Torrance, CA (US)

(72) Inventors: Toshiya Arai, Osaka (JP); Takahiro Yoneda, Osaka (JP); Yuta Shimotsuma, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 203 days.

(21) Appl. No.: 18/378,336

(22) Filed: Oct. 10, 2023

(65) Prior Publication Data

US 2024/0087371 A1 Mar. 14, 2024

Related U.S. Application Data

(63) Continuation of application No. 17/078,447, filed on Oct. 23, 2020, now Pat. No. 11,869,279, which is a (Continued)

(30) Foreign Application Priority Data

Oct. 5, 2018 (JP) ................................ 2018-189778
May 27, 2019 (JP) ................................ 2019-098794

(51) Int. Cl.
*G07C 5/00* (2006.01)
*G08G 1/01* (2006.01)

(52) U.S. Cl.
CPC .............. *G07C 5/008* (2013.01); *G08G 1/01* (2013.01)

(58) Field of Classification Search
CPC ........ G07C 5/008; G07C 5/0825; G08G 1/01; G08G 1/0112; G08G 1/0133;
(Continued)

(56) References Cited

U.S. PATENT DOCUMENTS 6,301,263 B1 10/2001 Maggenti
6,389,337 B1 5/2002 Kolls
(Continued)

FOREIGN PATENT DOCUMENTS

CN 108473140 A * 8/2018 .............. G08G 1/16
JP 2001-136513 5/2001
(Continued)

OTHER PUBLICATIONS

Communication pursuant to Article 94(3) EPC issued in Dec. 17, 2021 in European Patent Application No. 19 868 550.5.
(Continued)

*Primary Examiner* — Rufus C Point
(74) *Attorney, Agent, or Firm* — Wenderoth, Lind & Ponack, L.L.P.

(57) ABSTRACT

An information processing method performed using a computer includes: obtaining first vehicle information from a vehicle that is a monitoring target of a monitor, the first vehicle information indicating at least one of a running state and an external state of the vehicle; determining a monitoring priority level of the vehicle according to a degree of request for monitoring the vehicle by the monitor, the degree being based on the first vehicle information; generating presentation information for monitoring the vehicle, based on the monitoring priority level; and causing a presentation device to output the presentation information.

12 Claims, 12 Drawing Sheets

Related U.S. Application Data continuation of application No. PCT/JP2019/037776, filed on Sep. 26, 2019.

(58) Field of Classification Search
CPC .. G08G 1/0145; G08G 1/04; G08G 1/096725; G08G 1/096775; G05D 1/2247; G05D 2107/13; G05D 2109/10; G05D 1/2279; H04Q 9/00
See application file for complete search history.

(56) References Cited

U.S. PATENT DOCUMENTS

| | | | | |
|---|---|---|---|---|
| 7,123,926 | B2 | 10/2006 | Himmelstein | |
| 9,507,346 | B1 | 11/2016 | Levinson et al. | |
| 9,870,001 | B1 | 1/2018 | Mangal | |
| 10,564,638 | B1 * | 2/2020 | Lockwood | G05D 1/00 |
| 10,705,539 | B2 | 7/2020 | Pedersen | |
| 2004/0204842 | A1 | 10/2004 | Shinozaki | |
| 2010/0253541 | A1 * | 10/2010 | Seder | G08G 1/0962 340/905 |
| 2010/0321170 | A1 | 12/2010 | Cooper | |
| 2011/0060496 | A1 | 3/2011 | Nielsen | |
| 2011/0106375 | A1 | 5/2011 | Gurusamy Sundaram | |
| 2011/0109477 | A1 | 5/2011 | Edwardson | |
| 2011/0130916 | A1 * | 6/2011 | Mayer | B60L 3/0023 903/903 |
| 2013/0245858 | A1 | 9/2013 | Yonehara | |
| 2015/0153184 | A1 | 6/2015 | Mudalige et al. | |
| 2015/0186991 | A1 | 7/2015 | Meyer | |
| 2015/0371153 | A1 | 12/2015 | Lohmeier | |
| 2016/0023665 | A1 | 1/2016 | Sherony | |
| 2016/0253924 | A1 | 9/2016 | Kwak et al. | |
| 2016/0353021 | A1 | 12/2016 | Murakami | |
| 2017/0316064 | A1 | 11/2017 | Catten | |
| 2017/0351255 | A1 * | 12/2017 | Anderson | G01C 21/3453 |
| 2017/0372188 | A1 | 12/2017 | Simon | |
| 2018/0039268 | A1 | 2/2018 | Mangal | |
| 2019/0027045 | A1 | 1/2019 | Laur | |
| 2019/0094880 | A1 | 3/2019 | Agarwal | |
| 2019/0126942 | A1 | 5/2019 | Goto et al. | |
| 2019/0196466 | A1 | 6/2019 | Agarwal | |
| 2019/0204827 | A1 | 7/2019 | Bhalla | |
| 2019/0278298 | A1 * | 9/2019 | Pedersen | G05D 1/0287 |
| 2019/0339692 | A1 | 11/2019 | Sakai et al. | |

FOREIGN PATENT DOCUMENTS

| | | | | |
|---|---|---|---|---|
| JP | 2002-94971 | | 3/2002 | |
| JP | 2003-141687 | | 5/2003 | |
| JP | 2008021181 | A * | 1/2008 | B60K 35/22 |
| JP | 2011-71932 | | 4/2011 | |
| JP | 2017-200812 | | 11/2017 | |
| JP | 2018-63615 | | 4/2018 | |
| WO | 2018/159314 | | 9/2018 | |
| WO | 2018/168531 | | 9/2018 | |

OTHER PUBLICATIONS

Extended European Search Report issued Jul. 19, 2021 in European Application No. 19868550.5.
International Search Report issued Nov. 26, 2019 in International (PCT) Application No. PCT/JP2019/037776.

* cited by examiner

FIG. 4

T1

| PRIORITY LEVEL | SITUATION INFORMATION |
|---|---|
| 23 | OCCURRENCE OF ACCIDENT OF OWN VEHICLE |
| 13 | SUDDEN START |
| 18 | OCCURRENCE OF CALL |
| 3 | TIME SCHEDULE SLIPPAGE |
| 4 | RAILROAD CROSSING, PEDESTRIAN CROSSING, JUNCTION, SEPARATION, INTERSECTION |
| 8 | BLOCKING OF VEHICLES BEHIND, OCCURRENCE OF TRAFFIC CONGESTION CAUSED BY OWN VEHICLE |
| ⋮ | ⋮ |

FIG. 5

T2

| COMPLEMENTARY VALUE | SITUATION INFORMATION |
|---|---|
| 24 | OCCURRENCE OF ACCIDENT OF OWN VEHICLE |
| 14 | SUDDEN START |
| 19 | OCCURRENCE OF CALL |
| 4 | TIME SCHEDULE SLIPPAGE |
| 5 | RAILROAD CROSSING, PEDESTRIAN CROSSING, JUNCTION, SEPARATION, INTERSECTION |
| 9 | BLOCKING OF VEHICLES BEHIND, OCCURRENCE OF TRAFFIC CONGESTION CAUSED BY OWN VEHICLE |
| ⋮ | ⋮ |

INFORMATION PROCESSING METHOD AND INFORMATION PROCESSING SYSTEM

CROSS-REFERENCE TO RELATED APPLICATION

This is a continuation application of U.S. application Ser. No. 17/078,447 filed on Oct. 23, 2020 which is a continuation application of PCT International Application No. PCT/JP2019/037776 filed on Sep. 26, 2019, designating the United States of America, which is based on and claims priority of Japanese Patent Application No. 2018-189778 filed on Oct. 5, 2018 and Japanese Patent Application No. 2019-098794 filed on May 27, 2019. The entire disclosures of the above-identified applications, including the specifications, drawings and claims are incorporated herein by reference in their entirety.

BACKGROUND

1. Technical Field

The present disclosure relates to an information processing method and an information processing system.

2. Description of the Related Art

There are remote operation systems in which operators at remote locations indirectly operate driverless vehicles or vehicles capable of autonomous running without being operated by drivers, using wireless communication such as a wireless local area network (LAN) or a mobile phone line.

In such a remote operation system, sensing results obtained by observing the surroundings of a vehicle using various sensors such as a millimeter-wave radar, a laser radar, and a camera mounted in the vehicle are transmitted from the vehicle (hereafter referred to as "operated vehicle") to an operator via a communication means. The operator recognizes the state of the operated vehicle and the state of the surroundings of the operated vehicle based on the transmitted sensing results, determines how to control the operated vehicle, and examines a method of controlling the vehicle. The operator then transmits, to the operated vehicle, a control signal relating to running of the vehicle, thus remotely controlling the operated vehicle.

For example, Japanese Unexamined Patent Application Publication No. 2018-063615 (Patent Literature 1 (PTL 1)) discloses a method whereby, upon stop of running due to anomaly, whether the presence/absence of an obstacle at the stop position is recognizable is determined, and an operator is authorized to perform remote operation only in the case where the presence/absence of an obstacle can be determined, thus reducing the remote operation load on the operator.

SUMMARY

With the conventional technique disclosed in PTL 1, prior to the operation of the operated vehicle by the operator, the operated vehicle is monitored by the operator or a monitor, other than the operator, who does not perform the operation (hereafter the operator and the monitor are also collectively referred to as "monitor"). Given that when and where a dangerous situation such as an accident occurs are unknown, the monitor needs to monitor all scenes if possible, and thus is under a heavy monitoring load. It is therefore desirable to reduce the monitoring load on the monitor. PTL 1 discloses a method for reducing the load on the operator who remotely operates the vehicle, but does not disclose a method for reducing the monitoring load on the monitor who remotely monitors the vehicle.

The present disclosure has an object of providing an information processing method that can reduce a monitoring load on a monitor.

An information processing method according to an aspect of the present disclosure is an information processing method performed using a computer, including: obtaining first vehicle information from a vehicle that is a monitoring target of a monitor, the first vehicle information indicating at least one of a running state and an external state of the vehicle; determining a monitoring priority level of the vehicle according to a degree of request for monitoring the vehicle by the monitor, the degree being based on the first vehicle information; generating presentation information for monitoring the vehicle, based on the monitoring priority level; and causing a presentation device to output the presentation information.

An information processing system according to an aspect of the present disclosure is an information processing system including: an obtainer that obtains vehicle information from a vehicle that is a monitoring target of a monitor, the vehicle information indicating at least one of a running state and an external state of the vehicle; a determiner that determines a monitoring priority level of the vehicle according to a degree of request for monitoring the vehicle by the monitor, the degree being based on the vehicle information; and a presentation controller that generates presentation information for monitoring the vehicle based on the monitoring priority level, and causes a presentation device to output the presentation information.

A program according to an aspect of the present disclosure causes a computer to execute the foregoing information processing method.

These general and specific aspects may be implemented using a system, a method, an integrated circuit, a computer program, or a computer-readable recording medium such as CD-ROM, or any combination of systems, integrated circuits, computer programs, and recording media.

An information processing method according to the present disclosure can reduce a monitoring load on a monitor.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 4 is a diagram illustrating an example of a first table stored in a travel DB according to the embodiment;

FIG. 5 is a diagram illustrating an example of a second table stored in the travel DB according to the embodiment;

DETAILED DESCRIPTION OF THE EMBODIMENT

Figure 1:
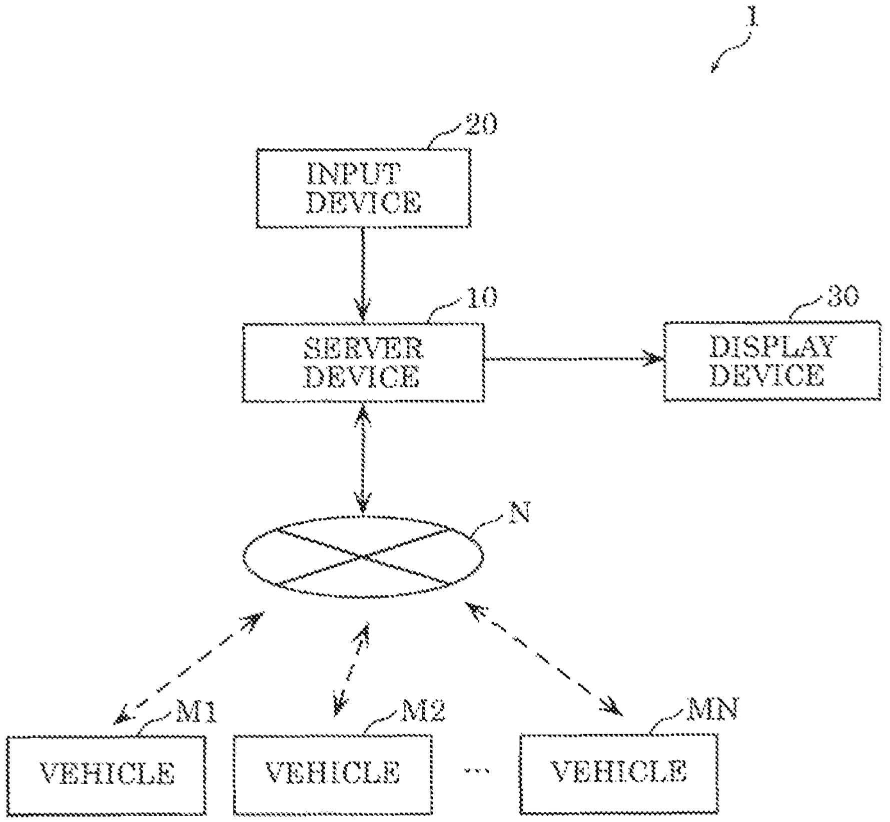
FIG. 1 is a block diagram illustrating a structure of a monitoring system according to an embodiment.

An information processing method according to an aspect of the present disclosure is an information processing method performed using a computer, including: obtaining first vehicle information from a vehicle that is a monitoring target of a monitor, the first vehicle information indicating at least one of a running state and an external state of the vehicle; determining a monitoring priority level of the vehicle according to a degree of request for monitoring the vehicle by the monitor, the degree being based on the first vehicle information; generating presentation information for monitoring the vehicle, based on the monitoring priority level; and causing a presentation device to output the presentation information.

Thus, a monitor can determine whether the vehicle is requested to be monitored, by checking the presentation information output by the presentation device. That is, the monitor can determine whether the vehicle is requested to be monitored, without constantly monitoring the vehicle and without analyzing the situation of the vehicle in detail. The running state or external state of the vehicle influences safe running of the vehicle. As a result of the presentation information being presented based on the monitoring priority level according to the degree of request for monitoring the running state or the external state, the monitor can consult the presentation information for monitoring. Thus, the information processing method according to an aspect of the present disclosure can reduce the monitoring load on the monitor. Specifically, the information processing method according to an aspect of the present disclosure can reduce the load of monitoring all images and the load of determining the request for monitoring the vehicle.

The information processing method may further include: determining the degree for the vehicle based on the first vehicle information, wherein the determining of the monitoring priority level includes determining the monitoring priority level of the vehicle according to the degree determined.

Thus, since the first vehicle information is obtained in a device that executes the information processing method according to an aspect of the present disclosure, as a result of the device determining the degree, the process of determining the monitoring priority level can be integrated to improve processing efficiency.

The determining of the monitoring priority level may include determining the monitoring priority level based on the degree and a weight that correspond to each of a plurality of items of situation information, the plurality of items of situation information each indicating a situation of the vehicle based on the first vehicle information.

Thus, the presentation information is generated based on the weight corresponding to each of the plurality of items of situation information. For example, in the case where the weight is a value corresponding to risk such as an accident, the presentation information is information that takes into account risk. That is, by checking the presentation information that takes into account risk, the monitor can determine the monitoring target vehicle according to the degree of risk. The monitoring load on the monitor can thus be further reduced.

The plurality of items of situation information may include first situation information and second situation information different from the first situation information, and the information processing method may include: determining a weight corresponding to the first situation information, according to at least one of the second situation information and the first vehicle information.

Thus, the weight of the first situation information can be changed according to other information (at least one of the second situation information and the first vehicle information). Since the situation of the vehicle and the surroundings of the vehicle changes with time, by appropriately determining the weight of the first situation information according to the current situation, the presentation information can be made to correspond to the current situation of the vehicle and the surroundings of the vehicle. Hence, the accuracy of determination by the monitor can be improved while reducing the monitoring load on the monitor.

The presentation information may include information indicating a contribution of at least one of the plurality of items of situation information to determination of the monitoring priority level.

Thus, by presenting the contribution to the monitor, the reason for determining specific monitoring work for the vehicle can be informed to the monitor. For example, by knowing that the contribution of "sudden start" is high from the presentation information, the monitor can determine that monitoring is requested to be performed with focus on any obstacle ahead in the traveling direction of the vehicle, vehicle speed, and the like. Consequently, the monitor can promptly recognize specific monitoring work, and therefore can perform accurate and prompt monitoring with reduced monitoring load.

The information processing method may further include: determining the degree based on position information of the vehicle included in the first vehicle information and a travel plan including a moving route of the vehicle.

Thus, the position information and travel plan of the vehicle are further used to generate the presentation information. That is, the monitor can know whether monitoring is requested, without analyzing the gap between the travel situation and the travel plan from the current position of the vehicle. The monitoring load on the monitor can therefore be reduced in terms of travel management, too.

The obtaining may include obtaining the first vehicle information from each of a plurality of the vehicles, and the presentation information may be information for monitoring a vehicle specified according to respective monitoring priority levels of the plurality of the vehicles.

Thus, the monitor can know which of the plurality of vehicles is requested to be monitored, by checking the presentation information output by the presentation device. That is, the monitor can know which vehicle is requested to be monitored, without constantly monitoring all of the plurality of vehicles and without analyzing the situations of all of the plurality of vehicles in detail. Hence, in the case where there are a plurality of monitoring target vehicles, the monitoring load on the monitor can be effectively reduced. Since the monitor can be aided in monitoring a plurality of vehicles, a plurality of vehicles can be monitored by fewer persons than the vehicles.

The presentation information may include information for monitoring a vehicle having a highest monitoring priority level or a monitoring priority level higher than a threshold from among the plurality of the vehicles.

Thus, the presentation device presents the information for monitoring the vehicle that is requested to be preferentially monitored by the monitor. For example, in the case where the presentation device is a display device and the presentation information includes an image captured by a vehicle, an image of the vehicle that is requested to be monitored by the monitor is displayed from among images captured by the plurality of vehicles. An image displayed by the display device may be switched to an image of the vehicle that is requested to be monitored by the monitor. Since the monitor need not determine the vehicle that is requested to be preferentially monitored, the monitoring load on the monitor can be further reduced.

The presentation information may include information for presenting first information for monitoring the vehicle specified according to a monitoring priority level thereof from among the plurality of the vehicles with more emphasis than second information for monitoring a vehicle other than the vehicle specified.

Thus, even in the case where presentation information of the plurality of vehicles are presented by the presentation device, the monitor can recognize a vehicle that requires attention from among the plurality of vehicles. For example, in the case where the presentation information includes an image of a vehicle, when displaying images of the plurality of vehicles, the image size is changed between the vehicle that requires attention and the other vehicles, so that the monitor can visually recognize the vehicle that requires attention. Thus, even in the case where the presentation information of the plurality of vehicles are presented by the presentation device, the monitoring load on the monitor can be reduced.

The presentation information may include information for presenting respective items of information for monitoring a plurality of vehicles specified, in order of respective monitoring priority levels of the plurality of vehicles specified.

Thus, even in the case where presentation information of the plurality of vehicles are presented by the presentation device, the monitor can recognize a vehicle that requires attention from among the plurality of vehicles. For example, in the case where the presentation information includes identification information, by presenting the identification numbers in order of monitoring priority levels, the monitor can recognize the vehicle that requires attention. Thus, even in the case where the presentation information of the plurality of vehicles are presented by the presentation device, the monitoring load on the monitor can be reduced.

The presentation information may include information for presenting information indicating the vehicle specified and a monitoring priority level of the vehicle specified in association with each other.

Thus, the monitor can recognize the respective monitoring priority levels of the plurality of vehicles from the presentation information, and determine which vehicle is requested to be preferentially monitored.

The presentation information may include an image captured by the vehicle specified or an image showing the vehicle specified.

Thus, the monitor can not only recognize a vehicle that is requested to be monitored, but also recognize the situation of the vehicle. This allows the monitor to promptly shift to monitoring work, while reducing the monitoring load.

The information processing method may further include: determining, when at least part of the first vehicle information is not obtained, the degree according to an influence of not obtaining the at least part of the first vehicle information on determination of the monitoring priority level.

Thus, even in the case where at least part of the first vehicle information cannot be obtained, an appropriate monitoring priority level can be determined. For example, in the case where first vehicle information having greater influence on the monitoring priority level than other first vehicle information cannot be obtained, the monitoring priority level decreases in a period during which such first vehicle information is not obtained. In this case, presentation information is not generated based on a monitoring priority level that reflects the actual situation, and inaccurate presentation information is presented. This is likely to cause the monitor to mistake a vehicle that is requested to be preferentially monitored. With the foregoing method, however, even in the case where part of the first vehicle information is not obtained, an appropriate monitoring priority level can be determined. This prevents the monitor from wrongly determining a monitoring target as a result of at least part of the first vehicle information not being obtained. The monitor may be presented with information that part of the first vehicle information is not obtained, via the presentation device.

The determining of the degree may include determining, when the at least part of the first vehicle information is not obtained, the degree according to the influence of not obtaining the at least part of the first vehicle information on the determination of the monitoring priority level, based on second vehicle information that is obtained earlier than the first vehicle information and includes the at least part.

Thus, even in the case where at least part of the first vehicle information cannot be obtained, the monitoring priority level can be determined using the second vehicle information which is past information and the influence on the determination of the monitoring priority level. That is, by complementing the unobtained first vehicle information based on the past information, it is possible to determine a monitoring priority level that reflects the actual situation more than a monitoring priority level based on the first vehicle information part of which cannot be obtained. This further prevents the monitor from wrongly determining a monitoring target as a result of at least part of the first vehicle information not being obtained.

The determining of the degree may include determining the degree according to the influence, based on an elapsed time from obtainment of the second vehicle information.

Thus, the monitoring priority level that takes into account the time during which at least part of the first vehicle information cannot be obtained is determined. If the period during which the first vehicle information is not obtained is longer, the gap between the second vehicle information obtained in the past and the current vehicle situation is greater, as a result of which the accuracy of the complemented first vehicle information, i.e. the monitoring priority level, decreases. With the foregoing method, however, the monitoring priority level that takes into account the period is determined, so that an increase of wrong determination of a monitoring target by the monitor due to lengthening of the period during which at least part of the first vehicle information cannot be obtained can be suppressed.

The obtaining may include obtaining the first vehicle information through communication with the vehicle, and the information processing method may further include: controlling communication traffic of the communication according to the monitoring priority level.

Thus, communication with the vehicle can be optimized according to the monitoring priority level. For example, the communication traffic, communication count, communication frequency, communication time, etc. with a vehicle having a low degree of request for monitoring can be reduced. Thus, the monitoring load on the monitor can be reduced while controlling use of network bandwidth for communication with the vehicle depending on the degree of request for monitoring.

An information processing system according to an aspect of the present disclosure is an information processing system including: an obtainer that obtains vehicle information from a vehicle that is a monitoring target of a monitor, the vehicle information indicating at least one of a running state and an external state of the vehicle; a determiner that determines a monitoring priority level of the vehicle according to a degree of request for monitoring the vehicle by the monitor, the degree being based on the vehicle information; and a presentation controller that generates presentation information for monitoring the vehicle based on the monitoring priority level, and causes a presentation device to output the presentation information.

This information processing system has the same effects as the foregoing information processing method.

These general and specific aspects may be implemented using a system, an apparatus, an integrated circuit, a computer program, or a computer-readable recording medium such as CD-ROM, or any combination of systems, apparatuses, integrated circuits, computer programs, and recording media.

An embodiment will be described in detail below, with reference to the drawings.

The embodiment described below shows a general and specific example. The numerical values, shapes, materials, structural elements, the arrangement and connection of the structural elements, steps, the order of steps, etc. shown in the following embodiments are mere examples, and do not limit the scope of the present disclosure. Of the structural elements in the embodiments described below, the structural elements not recited in any one of the independent claims representing the broadest concepts are described as optional structural elements.

Embodiment

An information processing method, etc. according to this embodiment will be described below, with reference to FIGS. 1 to 15.

A remote monitoring system (hereafter also simply referred to as "monitoring system") obtains a sensing result from a monitored vehicle via a communication means, and notifies the sensing result to a monitor. The monitor recognizes the state of the monitored vehicle and the state of the surroundings of the monitored vehicle based on the notified sensing result, and determines whether intervention of an operator is requested for the monitored vehicle. The monitor may examine an appropriate intervention method, including a method whereby the operator indirectly controls the monitored vehicle. In the case where the monitor determines that autonomous running of the monitored vehicle is difficult, the monitor requests the operator to perform remote operation. The operator transmits a control signal relating to vehicle running to the monitored vehicle (i.e. operated vehicle), to remotely control the monitored vehicle. In the case where the operator is the monitor, the operator may directly shift from monitoring to operation.

[Structure of Monitoring System]

A monitoring system including a server device that executes the information processing method according to this embodiment will be described below, with reference to FIGS. 1 to 11.

Figure 2:
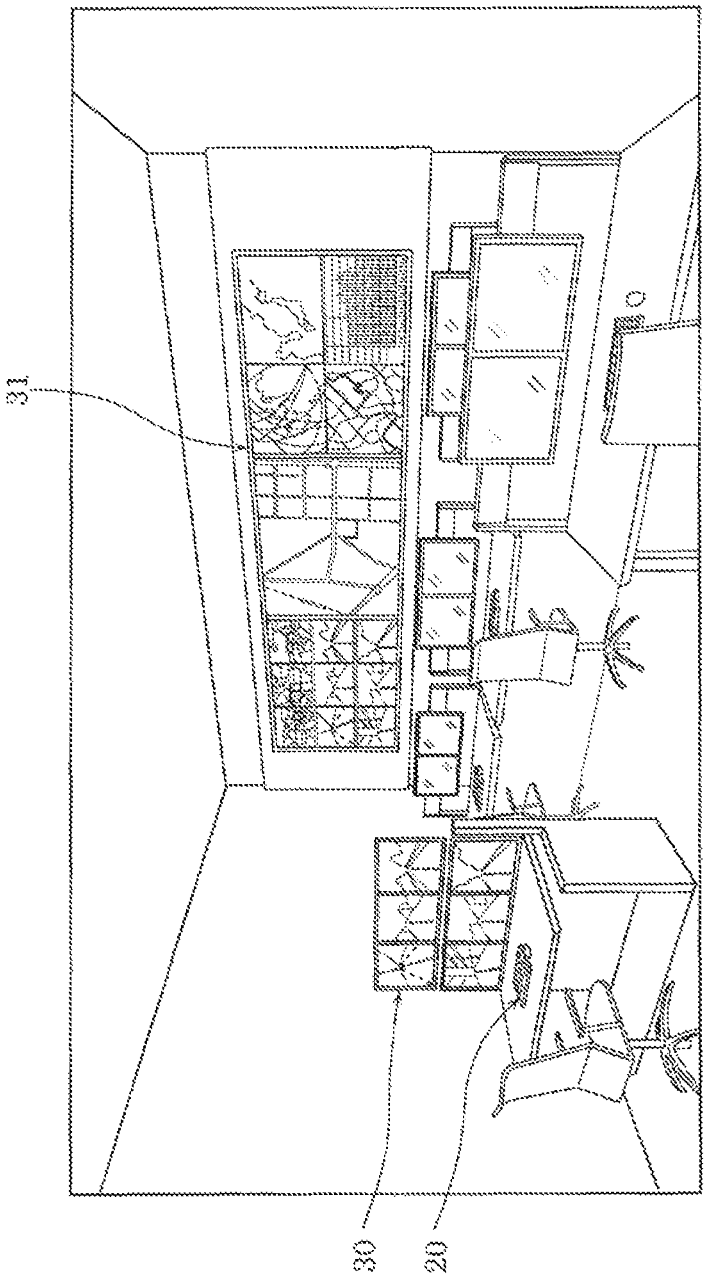
FIG. 2 is a schematic view of an example of a monitoring room according to the embodiment.

FIG. 1 is a block diagram illustrating a structure of monitoring system 1 according to this embodiment. FIG. 2 is a schematic view of an example of a monitoring room according to this embodiment.

Monitoring system 1 illustrated in FIG. 1 is an information processing system for monitoring vehicles M1, M2, . . . , and MN any of which can be an operated vehicle. Vehicles M1, M2, . . . , and MN are hereafter also referred to as "vehicles M1, etc.". The monitoring room illustrated in FIG. 2 is a room for monitoring vehicles M1, etc. by a monitor. In the monitoring room, information obtained from vehicles M1, etc. and information for monitoring vehicles M1, etc. are presented to the monitor, to enable the monitor to perform an operation for monitoring. In addition to the operation for monitoring by the monitor, an operation for remotely operating the operated vehicle may be performed. The monitor may be an operator who operates the operated vehicle, or a person other than the operator. Although an example in which monitoring system 1 is an information processing system that monitors the plurality of vehicles M1, etc. is described here, the number of vehicles monitored by monitoring system 1 is not limited. For example, monitoring system 1 may be an information processing system that monitors one vehicle.

As illustrated in FIG. 1, monitoring system 1 includes server device 10, input device 20, and display device 30.

Server device 10 is a processing device that performs determination relating to monitoring by the monitor. Specifically, server device 10 performs monitoring-related determination, by information processing by a computer using input to input device 20 and vehicle information obtained from vehicles M1, etc. The present disclosure has a feature that server device 10 determines, for each of vehicles M1, etc., a monitoring priority level indicating the degree of priority of monitoring using vehicle information obtained from the vehicle, and generates and outputs presentation information for monitoring the vehicle based on the monitoring priority level. This will be described in detail later.

Server device 10 is installed in a site communicably connectable to network N, and the physical position of server device 10 is not limited. For example, installing server device 10 in or near the monitoring room is advantageous for fast communication with input device 20 and display device 30.

Input device 20 is an input device that receives input of operation by the monitor. Input device 20 may be a keyboard, a mouse, a touch panel, etc. connected to server device 10, or may be buttons operable by press, touch, etc. Input device 20 provides information relating to the input operation to server device 10. Input device 20 is installed in the monitoring room. In the case where server device 10 is in a remote location, input device 20 and server device 10 may be connected via a network.

Display device 30 is a device that obtains the presentation information from server device 10 and outputs the presentation information as an image. The image includes photographs, illustrations, text, etc. Display device 30 is, for example, a liquid crystal display. The image output by display device 30 is visually recognized by the monitor, and used when determining, for example, whether the monitor is to monitor a vehicle, which vehicle is to be monitored by the monitor, and/or how to monitor the vehicle. Display device 30 is an example of a presentation device. Monitoring system 1 may include a sound output device as a presentation device, in addition to or instead of display device 30. Monitoring system 1 may include, as a presentation device, a device that displays presentation information on an object (e.g. a screen), such as a projector. Display device 30 is installed in the monitoring room. In the case where server device 10 is in a remote location, display device 30 and server device 10 may be connected via a network.

Vehicle M1 is a vehicle with or without any occupant, and is, for example, an automatic driving vehicle. Vehicle M1 is a vehicle that can be subjected to monitoring by the monitor. Vehicle M1 is present in an external space other than the monitoring room. For example, vehicle M1 is present on a road or in a parking space.

Vehicle M1 includes a communication interface. Vehicle M1 is connected to network N through communication, and communicably connected to server device 10 via network N. Vehicle M1 includes one or more cameras that image the surroundings of vehicle M1, and a plurality of sensors that detect the speed, acceleration, jerk, steering angle, remaining fuel amount, direction indicator activation state, ABS (anti-lock braking system) or AEB (automatic emergency braking) activation state of vehicle M1, the presence/absence, number, and type of any object in the surroundings of vehicle M1, and the distance, speed difference, and acceleration difference of vehicle M1 from the surrounding object. Vehicle M1 transmits information including image data generated as a result of imaging by the one or more cameras and sensing data such as the speed of vehicle M1 and the presence/absence of the surrounding object obtained by the plurality of sensors, to server device 10 via the communication interface and network N. This information transmitted by vehicle M1 is also referred to as "vehicle information". The foregoing various information transmitted as the vehicle information are also referred to as "vehicle information types". That is, the vehicle information per se may be of a plurality of types. Vehicle M1 can be subjected to acceleration/deceleration control, steering angle control, and the like by the monitor via network N, according to need. Such control by the monitor is also referred to as "remote operation".

The vehicle information may further include life/death information indicating whether the plurality of sensors are in operation, error information such as information about system errors of vehicle M1, call information for calling the monitor from an occupant of vehicle M1, and the like. In the case where vehicle M1 stores map information, the vehicle information may further include legal speed at the position where vehicle M1 is running, information indicating the positional relationship of vehicle M1 with traffic lanes, and/or information relating to a moving route set by vehicle M1.

In the vehicle information, the information of the speed, etc. of vehicle M1, the error information, the call information, the legal speed, the information indicating the positional relationship with traffic lanes, the moving route, and the like are an example of information indicating a running state of vehicle M1, and the information of the presence/absence of the surrounding object and the like are an example of information indicating a state outside vehicle M1. The vehicle information includes information indicating at least one of the running state and external state of vehicle M1.

Vehicles M2 to MN are each the same vehicle as vehicle M1, and each move independently of vehicle M1. Vehicles M2 to MN each transmit image data and sensing data generated by its device to server device 10, in the same way as vehicle M1.

Network N is a communication network to which each of server device 10 and vehicles M1, etc. is connected. A non-limiting example of a communication standard or communication scheme of network N is a wide area communication network using a mobile phone network, a satellite communication network, or Wi-Fi. Connection with vehicles M1, etc. is wireless.

Input device 20 and display device 30 are located in the monitoring room. Input device 20 and display device 30 are located so that the monitor can easily perform input and visual recognition. For example, input device 20 and display device 30 are located on a desk in front of a chair on which the monitor sits. Display device 31 that displays images of image data obtained by vehicles M1, etc., a map indicating the positions of vehicles M1, etc. and the like is located so as to be visible from the entire monitoring room. For example, display device 31 displays images based on image data obtained from all of vehicles M1, M2, . . . , and MN any of which can be an operated vehicle. For example, display device 31 is connected to server device 10, and displays images for all vehicles transmitted from server device 10. The displayed images are visually recognized by the monitor.

The number of monitors may be two or more. The number of monitors may be smaller than the number of vehicles M1, etc. The monitor is expected to select and monitor only a vehicle (or vehicles) determined to be requested to be monitored without monitoring the other vehicles, rather than constantly monitoring all vehicles M1, etc. This has the advantage that the number of personnel necessary for monitoring can be reduced and the monitor can concentrate on monitoring the vehicle that is requested to be monitored. A vehicle is determined to be requested to be monitored, for example, in the case where the vehicle is in a dangerous position, in the case where the vehicle is in a dangerous state, in the case where the vehicle is approaching a dangerous position, or in the case where the vehicle is predicted to be in a dangerous state. The number of monitors may be one, or the same as the number of vehicles M1, etc.

The monitor visually recognizes images presented by display device 30, and determines which of vehicles M1, etc. is to be monitored and how to monitor the vehicle. The monitor inputs a vehicle as a monitoring target or a monitoring method to server device 10 via input device 20. For example, display device 30 presents an image of a vehicle that is a monitoring target of the monitor from among vehicles M1, M2, . . . , and MN any of which can be an operated vehicle, an image for selecting a vehicle to be monitored, and the like.

A process by which server device 10 generates information for recommending the monitor as to which vehicle is subjected to monitoring (i.e. monitoring target) will be described in detail below. In this case, the monitor determines which vehicle is to be monitored, based on information presented by display device 30. If the monitoring target recommended by server device 10 is appropriate, the load of work of the monitor for searching for a monitoring target from among vehicles M1, etc. can be reduced.

Figure 3:
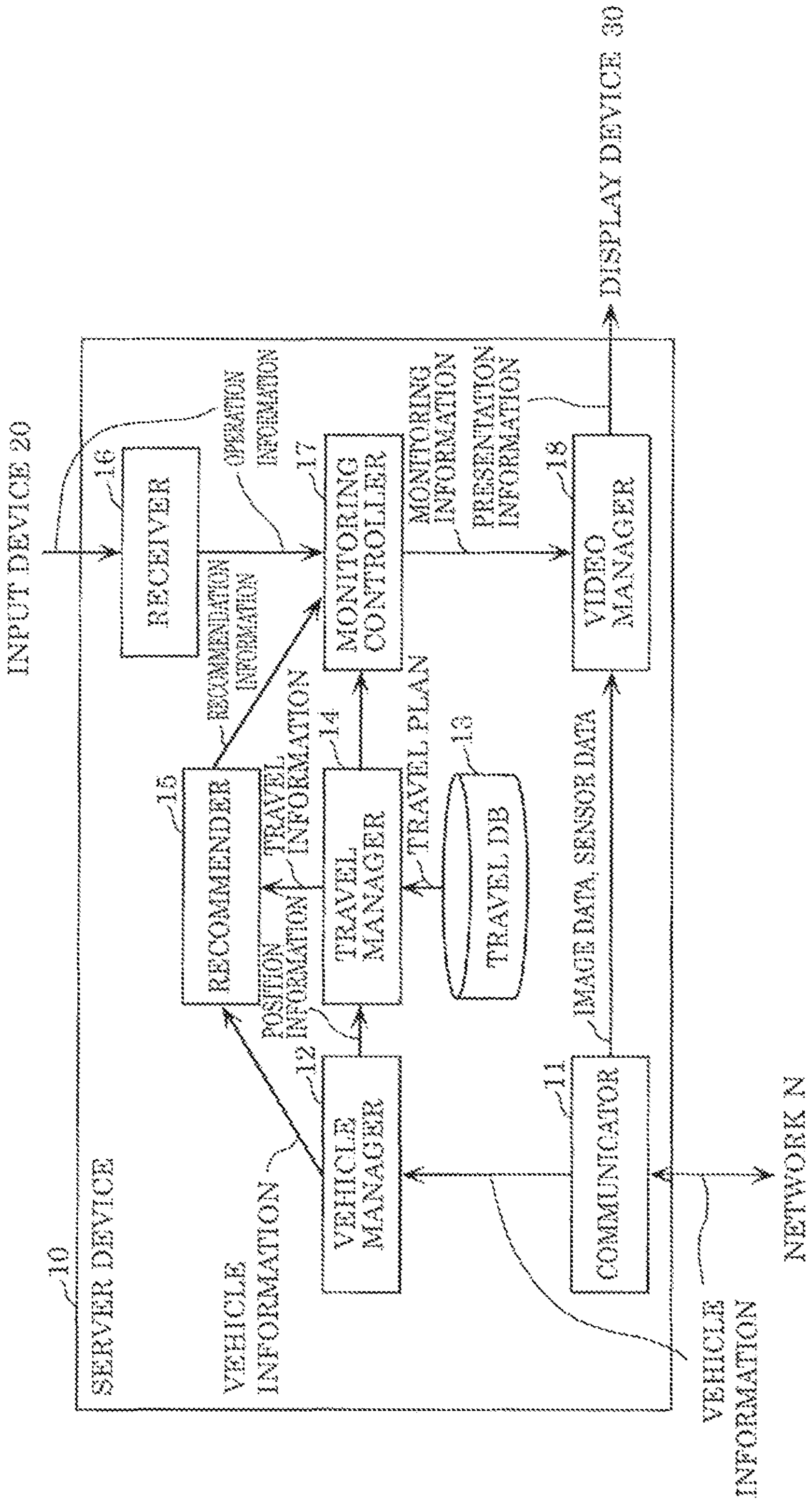
FIG. 3 is a block diagram illustrating a functional structure of a server device according to the embodiment.

FIG. 3 is a block diagram illustrating a functional structure of server device 10 according to this embodiment.

As illustrated in FIG. 3, server device 10 includes communicator 11, vehicle manager 12, travel database (DB) 13, travel manager 14, recommender 15, receiver 16, monitoring controller 17, and video manager 18.

Communicator 11 is a communication interface that is connected to network N and communicable connected to vehicles M1, etc. via network N. Communicator 11 obtains vehicle information from vehicles M1, etc. Communicator 11 is an example of an obtainer.

Vehicle manager 12 is a processing unit that manages vehicles M1, etc. Vehicle manager 12 obtains the vehicle information transmitted by vehicles M1, etc., and manages the position, speed, running state, and the like of each of vehicles M1, etc. based on the obtained vehicle information.

Travel DB 13 is a database that stores information for travel of each of vehicles M1, etc. Travel DB 13 holds information of a map and a travel plan, as the information for travel of each of vehicles M1, etc. The travel plan includes information indicating a moving route by which the vehicle is scheduled to run, and information indicating a position at which the vehicle is scheduled to be present on the route at each point in time during running. Travel DB 13 also stores a table in which a plurality of items of situation information of each of vehicles M1, etc. based on vehicle information are each associated with a degree of request for monitoring the vehicle by the monitor in the situation of the situation information. Travel DB 13 may further store a table for, in the case where at least part of vehicle information is not obtained, complementing the degree of request for monitoring corresponding to the at least part.

Each type of table stored in travel DB 13 will be described below, with reference to FIGS. 4 and 5. Travel DB 13 stores at least priority level table T1 out of priority level table T1 and complementary value table T2 described below.

FIG. 4 is a diagram illustrating an example of priority level table T1 stored in travel DB 13 according to this embodiment.

As illustrated in FIG. 4, priority level table T1 is a table associating priority levels and items of situation information of a vehicle with each other. In priority level table T1, a plurality of items of situation information of the vehicle are set, and a priority level is set for each item of situation information of the vehicle.

Herein, each priority level is a numeric value according to the degree of request for monitoring the vehicle by the monitor. For example, a higher numeric value indicates a higher degree of request for monitoring by the monitor. That is, the priority level is a numeric value according to the degree to which running by automatic driving is hindered, and indicates the magnitude of risk associated with automatic driving or associated with continuing automatic driving. The priority level is a numeric value based on first vehicle information.

Each item of situation information of the vehicle may be information indicating a situation of the vehicle based on the vehicle information. For example, “occurrence of accident of own vehicle” is information indicating a situation of the vehicle determined based on the running state, image, acceleration, and the like. In the case where the vehicle and an object around the vehicle are in contact with each other in an image, for example, “occurrence of accident of own vehicle” is detected. For example, “sudden start” is information indicating a situation of the vehicle determined based on the image, acceleration, and the like. In the case where the acceleration in a predetermined period when the vehicle starts to move from a stopped state is higher than or equal to a predetermined value, for example, “sudden start” is detected.

Each item of situation information of the vehicle may be information based not only on the vehicle information but also the travel plan including the moving route of the vehicle. For example, “time schedule slippage” is information indicating a situation of the vehicle determined based on the position information of the vehicle included in the vehicle information, the travel plan, and the like. In the case where the current position of the vehicle is at least a predetermined distance away from the current scheduled position of the vehicle included in the travel plan, for example, “time schedule slippage” is detected. For example, “railroad crossing” is information indicating a situation of the vehicle determined based on the position information of the vehicle included in the vehicle information, the map information, and the like. In the case where the current position of the vehicle is within a predetermined range from a railroad crossing, for example, “railroad crossing” is detected. Detection of situation information is performed by recommender 15.

Each item of situation information of the vehicle may be information based on the monitoring information. For example, “not monitored for long time” is information indicating a situation of the vehicle determined based on the monitoring time and the like included in the monitoring information. In the case where the elapsed time from when the monitoring of the vehicle ends or when the vehicle is set as a monitoring candidate is greater than or equal to a threshold, for example, “not monitored for long time” is detected. Alternatively, “risk that occurs as a result of not being monitored for long time” may be situation information of the vehicle. For example, the risk is detected depending on the elapsed time from when the monitoring of the vehicle ends or when the vehicle is set as a monitoring candidate. A plurality of thresholds and a plurality of risks may be used.

In FIG. 4, the five items of situation information (hereafter also referred to as “danger information”) from “occurrence of accident of own vehicle” to “time schedule slippage” are information indicating that the vehicle is in a dangerous situation, and the two items of situation information (hereafter also referred to as “caution information”) from “railroad crossing” to “occurrence of traffic congestion caused by own vehicle” are information indicating that the vehicle is likely to be in a dangerous situation in the future. The caution information indicates a situation in which running by automatic driving is possible as there is no problem in vehicle running. The foregoing “not monitored for long time” and “risk that occurs as a result of not being monitored for long time” are caution information.

Each priority level in FIG. 4 may be a value weighted by a weight (coefficient) corresponding to situation information. For example, "occurrence of accident of own vehicle" is a situation that immediately requires monitoring by the monitor and is assigned a high weight, and therefore its priority level is high. On the other hand, "time schedule slippage" is a situation that does not require monitoring as urgently as "occurrence of accident of own vehicle" and is assigned a low weight, and therefore its priority level is low. Specifically, each priority level may be set based on the degree of request for monitoring by the monitor and the weight that correspond to a corresponding one of the plurality of items of situation information each of which indicates a situation of the vehicle based on the vehicle information. The weight may be determined, for example, according to the seriousness of an accident that can occur in the situation of the corresponding situation information or the accident occurrence rate. The accident occurrence rate is the probability that an event (e.g. accident) which is requested to be handled by the monitor occurs if the situation of the vehicle (e.g. "occurrence of traffic congestion caused by own vehicle") is left unattended.

FIG. 5 is a diagram illustrating an example of complementary value table T2 stored in travel DB 13 according to this embodiment.

As illustrated in FIG. 5, complementary value table T2 is a table associating complementary values and items of situation information of a vehicle with each other. In complementary value table T2, a plurality of items of situation information of the vehicle are set, and a complementary value is set for each item of situation information of the vehicle. The types of situation information of the vehicle set in complementary value table T2 may be, for example, the same as the types of situation information of the vehicle set in priority level table T1. Each complementary value is a numeric value according to the influence of not obtaining at least part of the vehicle information and the travel information on the determination of the monitoring priority level. For example, when the influence on the monitoring priority level is higher, the complementary value is higher. The monitoring priority level is determined based on a value (e.g. a sum) calculated from a priority level corresponding to each detected item of situation information from among the plurality of items of situation information. The complementary value may be higher than or lower than the priority level.

At least one of priority level table T1 and complementary value table T2 may include priority levels or complementary values for external environments. Take priority level table T1 as an example. Priority level table T1 may further include each external environment and a priority level associated with the external environment. The external environment includes at least one of traffic congestion information, weather information, accident history information, road surface situation, and road width information of a road on which the vehicle is running. The traffic congestion information includes the number of other vehicles running on the running route of the vehicle. The weather information includes clouds, rain, and snow. The road surface state includes wet and icy. The external environment is detected, for example, from sensing data, image data, map information, and the like.

Referring back to FIG. 3, travel manager 14 is a processing unit that manages travel of each of vehicles M1, etc. Travel manager 14 obtains information such as a travel plan of each of vehicles M1, etc. from travel DB 13, and transmits instruction information including a moving route of the vehicle to the vehicle M1. Travel manager 14 also determines travel information including information of how long the travel of the vehicle is delayed with respect to the travel plan.

Recommender 15 is a processing unit that generates information for recommending a vehicle as a monitoring target of the monitor to the monitor. Recommender 15 obtains, from vehicle manager 12, the vehicle information transmitted by each of vehicles M1, etc., and obtains, from travel manager 14, the travel information relating to the travel of the vehicle. Recommender 15 then generates recommendation information for recommending a vehicle as a monitoring target of the monitor to the monitor, based on the obtained vehicle information and travel information. The recommendation information includes information specifying the vehicle that is subjected to recommendation for monitoring. For example, the recommendation information is represented by a monitoring priority level indicating the degree to which the vehicle is to be preferentially monitored as compared with the other vehicles. The recommendation information may be a monitoring recommendation level indicating the degree to which the vehicle is recommended as the monitoring target. Recommender 15 determines the monitoring priority level based on at least the vehicle information.

In the case where there is no vehicle as the monitoring target of the monitor (e.g. there is no vehicle whose monitoring priority level is higher than or equal to a predetermined threshold), recommender 15 may generate information indicating that no monitoring is requested. The information indicating that no monitoring is requested is included in the recommendation information. Recommender 15 is an example of a determiner.

Receiver 16 is a processing unit that receives operation information indicating input operation by the monitor input to input device 20. For example, the operation information includes monitoring target switching operation.

Monitoring controller 17 is a processing unit that determines a vehicle as a monitoring target. Monitoring controller 17 determines the vehicle as the monitoring target based on the recommendation information generated by recommender 15 and the operation information received by receiver 16, and generates monitoring information indicating the vehicle as the monitoring target. Monitoring controller 17 provides the generated monitoring information to video manager 18.

The monitoring information generated by monitoring controller 17 includes information specifying the vehicle as the monitoring target. The monitoring information may also include information indicating the reason why the vehicle is determined as the monitoring target. The monitoring information includes, for example, information indicating which of the plurality of items of situation information in FIG. 4 is detected. The monitoring information may further include the monitoring priority level.

Monitoring controller 17 has an automatic update mode and a manual update mode, as operation modes for determination of a monitoring target vehicle. The automatic update mode is a mode of determining the monitoring target vehicle according to the recommendation information and generating the monitoring information regardless of whether the operation information is received or the contents of the received operation information. The manual update mode is a mode of determining the monitoring target vehicle according to the operation information and generating the monitoring information regardless of whether there is recommendation information or the contents of the recommendation information.

Video manager 18 is a processing unit that manages video to be displayed on display device 30. Video manager 18 generates presentation information including image data relating to the video to be displayed on display device 30, and outputs the presentation information to display device 30. Video manager 18 obtains the monitoring information from monitoring controller 17, and, in the case where the monitoring information includes the information specifying the vehicle as the monitoring target, includes, in the presentation information, image data which communicator 11 has received from the monitoring target vehicle. Video manager 18 is an example of a presentation controller that generates presentation information and causes display device 30 to output the generated presentation information.

Specifically, the presentation information may include information indicating the vehicle as the monitoring target indicated in the monitoring information. In the case where the monitoring information includes information indicating one or more vehicles that can be the monitoring target, the presentation information may include the monitoring priority level of each of the one or more vehicles included in the monitoring information. In the case where the monitoring information includes information indicating a monitoring direction, the presentation information may include a captured image of the monitoring direction included in the monitoring information. In the case where there is no vehicle as the monitoring target of the monitor, the presentation information may include information indicating that no monitoring is requested.

Examples of the presentation information generated by video manager 18, i.e. displayed by display device 30, will be described below.

Figure 6:
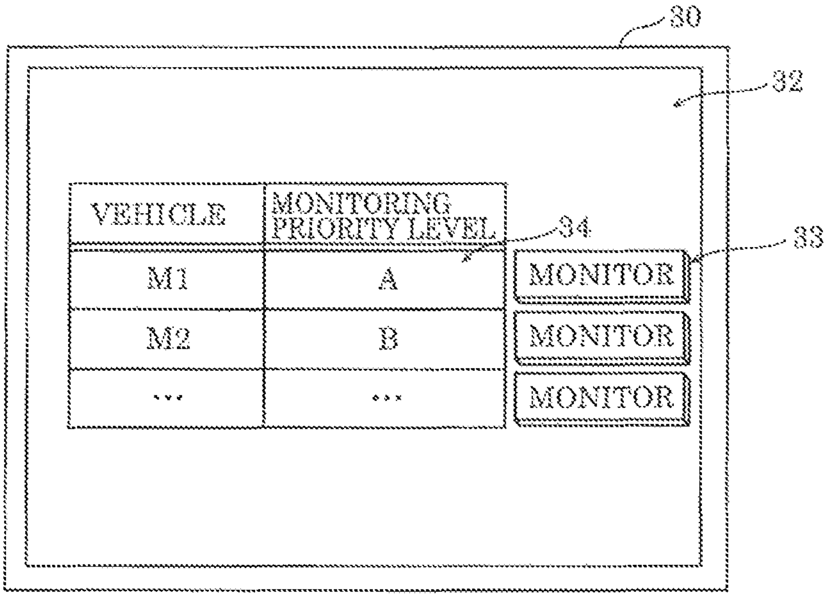
FIG. 6 is an explanatory diagram illustrating a first example of presentation information according to the embodiment.

FIG. 6 is an explanatory diagram illustrating a first example of presentation information according to this embodiment. FIG. 6 illustrates an example in which monitoring priority levels are presented as presentation information.

As illustrated in FIG. 6, image 32 displayed by display device 30 includes image 34 indicating the monitoring priority level of each of vehicles M1, etc. That is, video manager 18 causes display device 30 to present image 32 in which vehicles M1, etc. are associated with their monitoring priority levels. The monitoring priority levels are each information indicating the degree by which the vehicle is to be preferentially monitored. For example, the monitoring priority levels are expressed in three levels of A (high), B (medium), and C (low). For example, the monitoring priority level of vehicle M1 is A, and the monitoring priority level of vehicle M2 is B. Image 32 includes image 33 of each of respective buttons for starting monitoring of vehicles M1, etc. The monitoring priority levels may be numeric values. For example, the monitoring priority levels may each be a value obtained by adding together the priority levels corresponding to the detected items of situation information from among the plurality of items of situation information. An initial value of each monitoring priority level may be a predetermined value (e.g. 0). The initial value of the monitoring priority level means that there is no situation that requires immediate or future monitoring.

The presentation information is, for example, information for monitoring vehicle M1 or the like specified according to the respective monitoring priority levels of the plurality of vehicles M1, etc. The presentation information may include information for preferentially presenting a vehicle whose monitoring priority level is high. The presentation information may include information for presenting respective items of information indicating the plurality of vehicles M1, etc. in order of their monitoring priority levels. The presentation information may include information for presenting respective items of information for monitoring vehicles specified according to their monitoring priority levels from among the plurality of vehicles M1, etc., in order of the monitoring priority levels of the plurality of specified vehicles. The presentation information may include information for presenting information indicating each vehicle specified according to the monitoring priority level from among the plurality of vehicles M1, etc. and the monitoring priority level of the specified vehicle in association with each other. The presentation information may include information for displaying the vehicles in descending order of monitoring priority level or in ascending order of monitoring priority level. FIG. 6 illustrates an example in which the vehicles are displayed in descending order of monitoring priority level.

The presentation information may include information for presenting information (an example of first information) for monitoring a vehicle specified according to the monitoring priority level from among the plurality of vehicles M1, etc. with more emphasis than information (an example of second information) for monitoring the vehicles other than the specified vehicle. For example, the presentation information may include information (hereafter also referred to as "emphasis information") for presenting information (an example of first information) indicating a vehicle having the highest monitoring priority level or a monitoring priority level higher than the threshold with more emphasis than information (an example of second information) indicating the other vehicles. For example, the presentation information may include information for presenting, from among button images 33, button image 33 corresponding to vehicle M1 whose monitoring priority level is high in a form different from button images 33 corresponding to the other vehicles.

Figure 7:
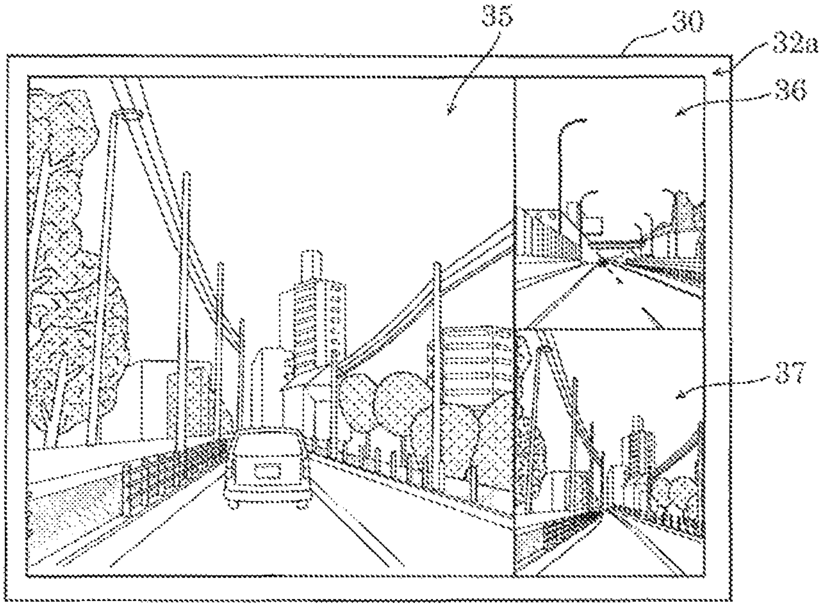
FIG. 7 is an explanatory diagram illustrating a second example of presentation information according to the embodiment.

FIG. 7 is an explanatory diagram illustrating a second example of presentation information according to this embodiment. FIG. 7 illustrates an example in which image data obtained from vehicles M1, etc. are presented as presentation information.

As illustrated in FIG. 7, image 32*a* displayed by display device 30 includes images 35 to 37 respectively for vehicles M1, etc. For example, image 35 is an image based on image data captured by one or more cameras in vehicle M1 (an example of an attention vehicle) whose monitoring priority level is high. Likewise, images 36 and 37 are each an image based on image data captured by one or more cameras in a vehicle (an example of other vehicle), such as vehicle M2, etc., whose monitoring priority level is lower than that of vehicle M1. Thus, the presentation information may include, as emphasis information, information for displaying image 35 of vehicle M1 whose monitoring priority level is high in a larger area than each of images 36 and 37 of vehicle M2, etc. whose monitoring priority levels are lower than that of vehicle M1. Image 35 is an example of a first image included in first information, and images 36 and 37 are each an example of a second image included in second information.

Image 32*a* may include an image of each of respective buttons (see button images 33 illustrated in FIG. 6) for starting monitoring of vehicles M1, etc.

The monitor visually recognizes image 32 or 32*a*, selects a vehicle as a monitoring target, and operates button image 33 corresponding to the selected vehicle. This operation is received by input device 20, and operation information indicating the operation is received by receiver 16.

FIGS. 6 and 7 illustrate examples in which images for the monitor selecting a vehicle as a monitoring target are displayed on display device 30, i.e. presentation information includes information for the monitor to select a monitoring target vehicle. Examples in which presentation information is information for displaying an image of a vehicle that is a monitoring target of the monitor will be described below.

Figure 8:
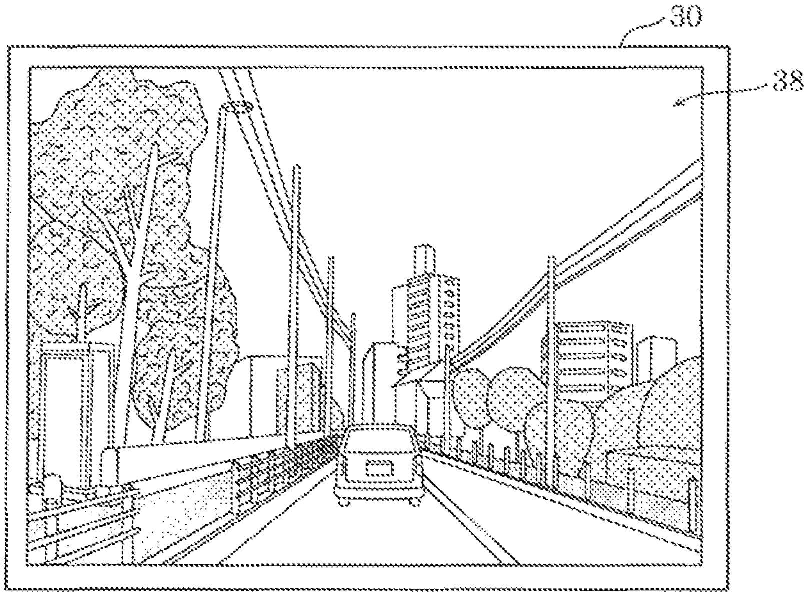
FIG. 8 is an explanatory diagram illustrating a third example of presentation information according to the embodiment.

FIG. 8 is an explanatory diagram illustrating a third example of presentation information according to this embodiment. FIG. 8 illustrates an example in which an image based on image data obtained from vehicle M1 is presented as presentation information.

As illustrated in FIG. 8, image 38 displayed by display device 30 is an image of vehicle M1 whose monitoring priority level is high (e.g. highest). Thus, the presentation information includes information for monitoring vehicle M1 having the highest monitoring priority level or a monitoring priority level higher than the threshold from among the plurality of vehicles M1, etc. The presentation information includes image 38 (see FIG. 8) captured by vehicle M1 having the highest monitoring priority level or a monitoring priority level higher than the threshold from among the plurality of vehicles M1, etc., or an image showing vehicle M1. In other words, the presentation information may include, for example, information for switching an image displayed on display device 30 to image 38 captured by vehicle M1 or an image showing the vehicle. Thus, the work of the monitor to select a monitoring target can be omitted, so that the monitoring load on the monitor can be further reduced.

Figure 9:
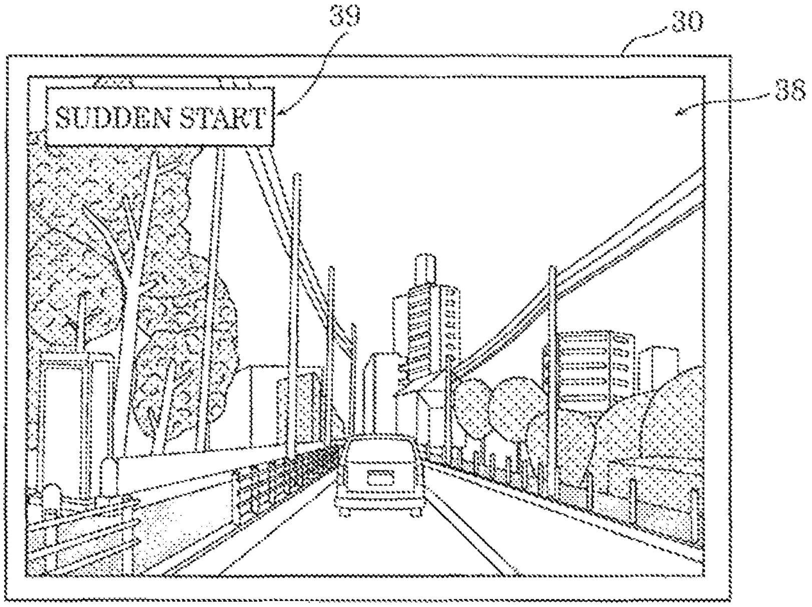
FIG. 9 is an explanatory diagram illustrating a fourth example of presentation information according to the embodiment.

FIG. 9 is an explanatory diagram illustrating a fourth example of presentation information according to this embodiment. FIG. 9 illustrates an example in which a reason for selecting vehicle M1 is presented in image 38 illustrated in FIG. 8. That is, the presentation information includes information indicating the contribution of at least one of the plurality of items of situation information to the monitoring priority level.

As illustrated in FIG. 9, image 38 displayed by display device 30 includes image 39 indicating a reason for determining vehicle M1 as the monitoring target. Image 39 is included in information indicating contribution. The image in FIG. 9 indicates that "sudden start" contributes most to the determination of vehicle M1 as the monitoring target. Image 39 is included in information indicating contribution. A priority level corresponding to "sudden start" may be superimposed on image 38. In the case where situation information other than "sudden start" is detected, the detected situation information may be presented in a state of being superimposed on image 38.

Figure 10:
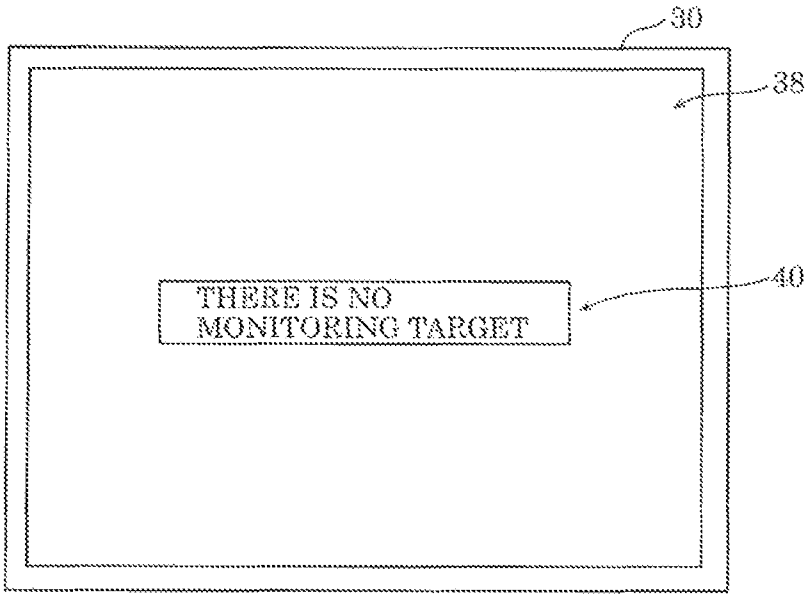
FIG. 10 is an explanatory diagram illustrating a fifth example of presentation information according to the embodiment.

In the case where there is no vehicle whose monitoring priority level is higher than or equal to the predetermined threshold (e.g. in the case where there is no monitoring target vehicle), presentation information indicating that no monitoring is requested may be presented. For example, information indicating that there is no monitoring target, information urging to take a break from monitoring work, or information urging to do work other than monitoring work may be presented as presentation information. FIG. 10 is an explanatory diagram illustrating a fifth example of presentation information according to this embodiment. Specifically, FIG. 10 illustrates an example in which image 38 including image 40 indicating that there is no monitoring target as the information indicating that no monitoring is requested is displayed.

The time during which there is no vehicle whose monitoring priority level is higher than or equal to the predetermined threshold, i.e. the time during which no monitoring is requested, may be recorded, and statistical information of the time during which no monitoring is requested may be presented. For example, statistical information such as a mean value, a median value, or a mode value of the time during which no monitoring is requested or its distribution in a specific period such as a day, a week, or a month may be presented. A process of recording the time during which no monitoring is requested is performed, for example, by monitoring controller 17. The statistical information may be included in the monitoring information.

From the statistical information of the time during which no monitoring is requested, a suggestion for a period away from monitoring work, such as a break, may be presented. For example, information urging to take a break in a time of day in which the time during which no monitoring is requested is statistically long may be presented. A process of suggesting a period away from monitoring work, such as a break, is performed, for example, by monitoring controller 17. The suggestion (e.g. information urging to take a break) may be included in the monitoring information.

Figure 11:
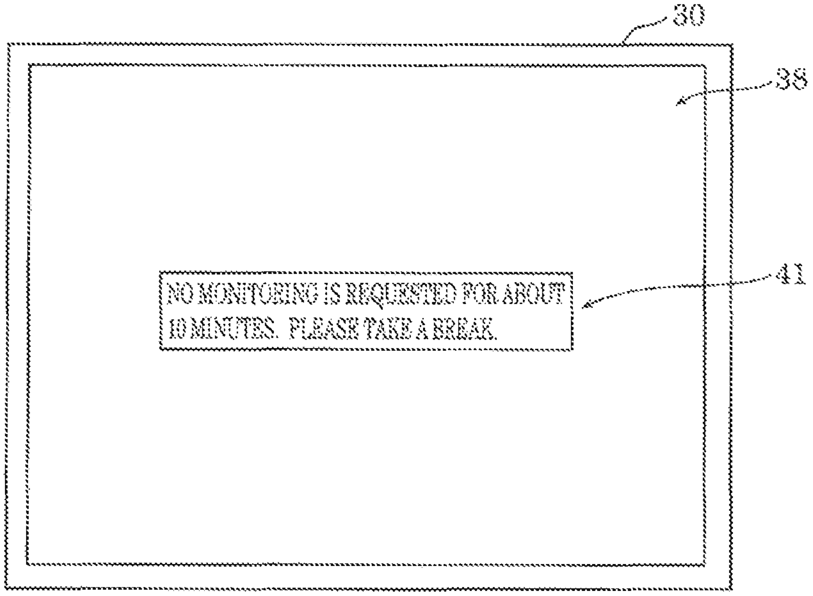
FIG. 11 is an explanatory diagram illustrating a sixth example of presentation information according to the embodiment.

FIG. 11 is an explanatory diagram illustrating a sixth example of presentation information according to this embodiment. Specifically, FIG. 11 illustrates an example in which image 38 including image 41 indicating, as the time during which no monitoring is requested and the information urging to take a break, a mean value of the time during which no monitoring is requested and a suggestion to take a break is displayed.

[Operation of Monitoring System]

A process by monitoring system 1 having the structure described above will be described below.

Figure 12:
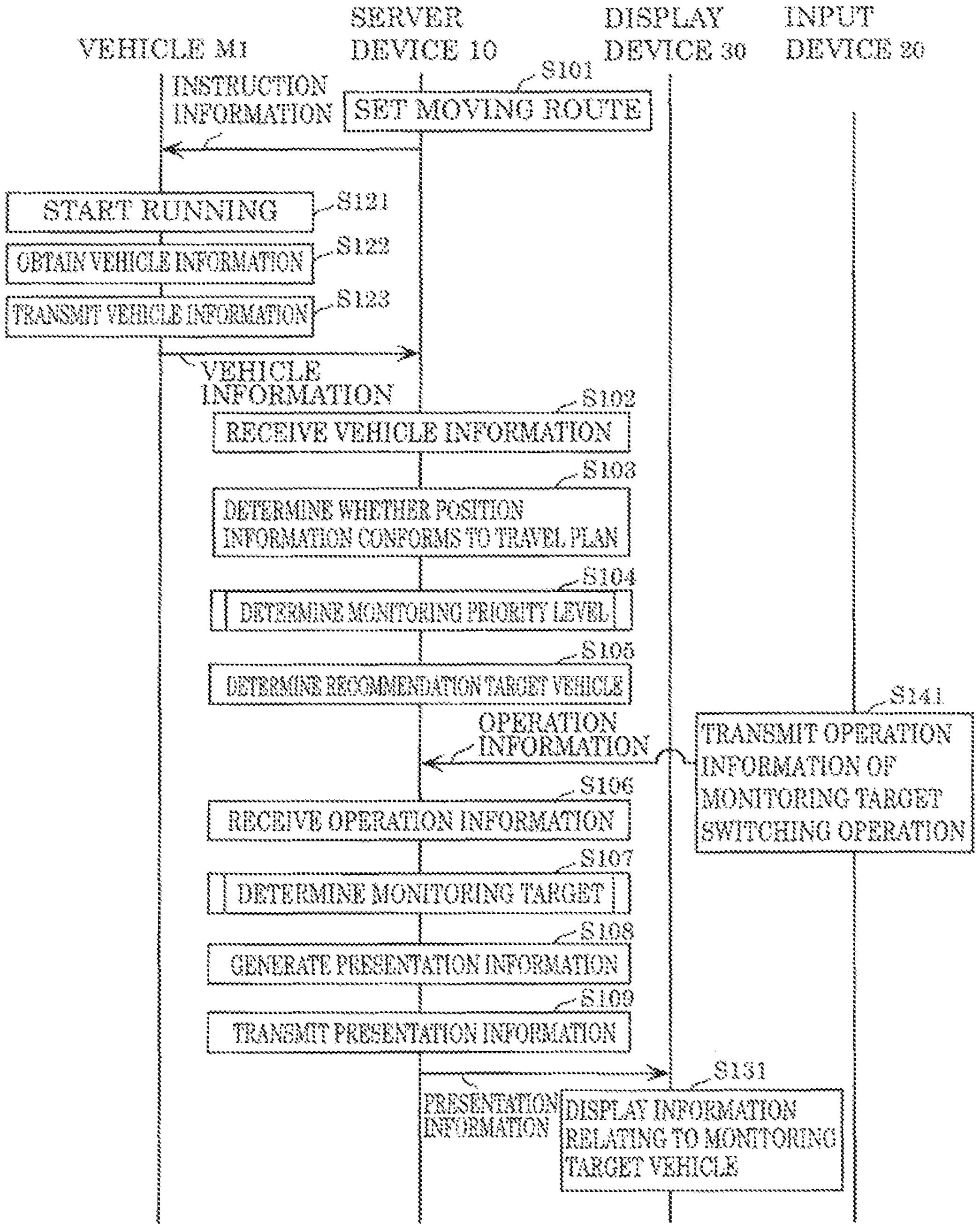
FIG. 12 is a sequence diagram illustrating a process by the monitoring system according to the embodiment.

FIG. 12 is a sequence diagram illustrating a process by monitoring system 1 according to this embodiment. The sequence diagram in FIG. 12 illustrates flow of processing for determining a recommended monitoring target using vehicle information. Although vehicle M1 is used as an example of vehicles M1, etc. in FIG. 12, the same process is performed for other vehicles M2 to MN.

As illustrated in FIG. 12, in Step S101, travel manager 14 in server device 10 sets a moving route of vehicle M1 based on a travel plan of vehicle M1 stored in travel DB 13. Travel manager 14 then transmits instruction information including the set moving route to vehicle M1. For other vehicles M2 to MN, travel manager 14 equally sets a moving route and transmits instruction information.

In Step S121, vehicle M1 receives the instruction information transmitted by travel manager 14 in Step S101. Vehicle M1 runs according to the moving route set by travel manager 14, based on the received instruction information.

In Step S122, vehicle M1 obtains vehicle information (i.e. sensing data and image data) indicating position, speed, acceleration, steering angle, etc. during running.

In Step S123, vehicle M1 transmits the vehicle information (i.e. sensing data and image data) obtained in Step S122, to server device 10. After Step S123, vehicle M1 also obtains vehicle information (i.e. sensing data and image data) indicating position, speed, acceleration, steering angle, etc. during running and transmits the vehicle information to server device 10.

The processes in Step S121 to S123 are equally performed for other vehicles M2 to MN.

In Step S102, communicator 11 in server device 10 receives the vehicle information (i.e. sensing data and image data) including the vehicle information transmitted by each of vehicles M1, etc. in Step S123. Communicator 11 provides the received vehicle information (i.e. sensing data and image data) to vehicle manager 12. In Step S102, communicator 11 obtains the vehicle information (i.e. sensing data and image data) that is obtained a vehicle which can be a monitoring target of the monitor and indicates at least one of the running state and external state of the vehicle, through communication.

In Step S103, travel manager 14 in server device 10 determines whether the position information included in the vehicle information received in Step S102 conforms to the travel plan, and generates travel information indicating the determination result.

In Step S104, recommender 15 determines a monitoring priority level for each of the plurality of vehicles M1, etc. Specifically, recommender 15 obtains, from vehicle manager 12, the vehicle information received by communicator 11 in Step S102, and obtains the travel information generated by travel manager 14 in Step S103. Recommender 15 then determines the monitoring priority level of the vehicle according to the degree of request for monitoring the vehicle by the monitor based on the obtained vehicle information and travel information. Specifically, recommender 15 determines the monitoring priority level based on the obtained vehicle information and travel information and a table (e.g. priority level table T1) stored in travel DB 13.

In Step S105, recommender 15 determines a recommendation target vehicle that is requested to be monitored by the monitor, based on the monitoring priority level determined in Step S104. Specifically, recommender 15 may determine a vehicle having the highest monitoring priority level or a monitoring priority level higher than or equal to the predetermined threshold from among the plurality of vehicles M1, etc., as the recommendation target vehicle. The number of recommendation target vehicles determined in Step S106 is not limited to one, and may be two or more. That is, in Step S105, recommender 15 may determine two or more vehicles from among the plurality of vehicles M1, etc., as recommendation target vehicles. For example, recommender 15 may determine one or more vehicles M1 whose monitoring priority levels are higher than or equal to the predetermined value, as recommendation target vehicles. From the perspective of reducing the monitoring load on the monitor, however, the number of recommendation target vehicles determined in Step S105 is desirably smaller, and may be, for example, one.

In Step S105, recommender 15 may determine that there is no recommendation target vehicle that is requested to be monitored by the monitor, based on the monitoring priority level determined in Step S104. For example, in the case where there is no vehicle whose monitoring priority level is higher than or equal to the predetermined threshold from among the plurality of vehicles M1, etc., recommender 15 may determine that there is no recommendation target vehicle that is requested to be monitored by the monitor. That is, in Step S105, recommender 15 may determine whether there is a recommendation target vehicle that is requested to be monitored by the monitor, based on the monitoring priority level determined in Step S104.

Recommender 15 then provides recommendation information including information specifying the recommendation target vehicle or information indicating that there is no recommendation target vehicle, to monitoring controller 17.

In Step S141, input device 20 receives operation for switching a monitoring target by the monitor. This operation may be operation based on determination as a result of the monitor visually recognizing information displayed on display device 31 and examining which vehicle is to be a monitoring target. Input device 20 transmits operation information indicating the received operation, to server device 10. The operation information includes information indicating which of vehicles M1, etc. the monitor has switched the monitoring target to. In the case where operation by the monitor has not been performed, input device 20 may transmit, to server device 10, operation information indicating that there is no operation, or transmit no operation information.

In Step S106, receiver 16 in server device 10 receives the operation information transmitted by input device 20 in Step S141.

In Step S107, monitoring controller 17 determines a monitoring target of the monitor, and generates monitoring information for specifying the monitoring target. Here, monitoring controller 17 determines the monitoring target, based on the recommendation information provided by recommender 15 in Step S105 and the operation information received by receiver 16. Monitoring controller 17 provides the generated monitoring information to video manager 18.

In the case where monitoring controller 17 obtains recommendation information including information that there is no recommendation target vehicle, in Step S107, monitoring controller 17 may generate monitoring information including at least one of: information indicating that no monitoring is requested; statistical information of the time during which no monitoring is requested; and a suggestion for a period away from monitoring work, and provide the monitoring information to video manager 18. Monitoring controller 17 may, for example, record the time from when the recommendation information indicating that there is no recommendation target vehicle is obtained to when recommendation information including information specifying a recommendation target vehicle is first obtained, as the time during which no monitoring is requested.

In Step S108, video manager 18 generates presentation information for presentation to the monitor, based on the monitoring information provided from monitoring controller 17 in Step S107.

In Step S109, video manager 18 transmits the presentation information generated in Step S108 to display device 30. In detail, in Steps S108 and S109, video manager 18 generates presentation information for monitoring a vehicle based on the monitoring priority level, and transmits the generated presentation information to display device 30.

In Step S131, display device 30 receives the presentation information transmitted by monitoring controller 17 in Step S109, and displays information relating to a monitoring target vehicle based on the presentation information. In detail, video manager 18 causes display device 30 to output the presentation information, by transmitting the presentation information to display device 30.

In the case where the current operation mode of monitoring controller 17 is the manual update mode, the processes in Steps S106 and S141 may be omitted.

Figure 13:
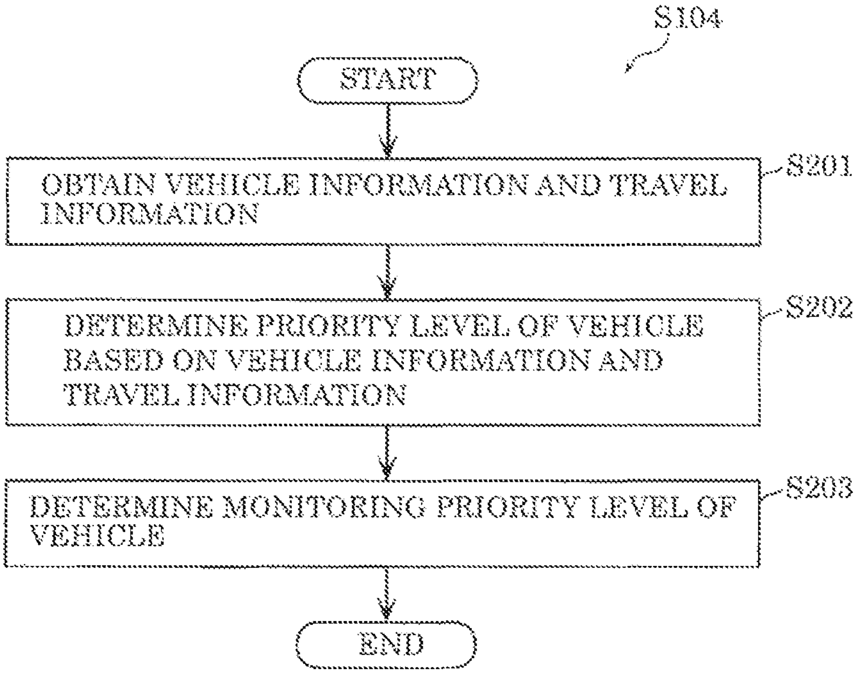
FIG. 13 is a flowchart illustrating a process by a recommender according to the embodiment.

FIG. 13 is a flowchart illustrating a process by recommender 15 according to this embodiment. FIG. 13 illustrates the details of the process in Step S104 in FIG. 12.

In Step S201, recommender 15 obtains the vehicle information and the travel information. Specifically, recommender 15 obtains the vehicle information from vehicle manager 12, and obtains the travel information relating to the travel of each of vehicles M1, etc. from travel manager 14. Recommender 15 obtains at least the vehicle information in Step S201.

In Step S202, recommender 15 determines the monitoring priority level of the vehicle based on the vehicle information and the travel information of the vehicle. Specifically, recommender 15 determines the monitoring priority level based on the vehicle information and the travel information of the vehicle and priority level table T1. In detail, recommender 15 determines the degree of request for monitoring the vehicle by the monitor, based on the vehicle information and the travel information. Recommender 15 determines, as the degree of request for monitoring, a priority level corresponding to an item of situation information detected from among the plurality of items of situation information in priority level table T1.

For example, when recommender 15 determines that an accident occurs in the vehicle from the running state, camera images, acceleration, and the like, recommender 15 detects "occurrence of accident of own vehicle", and determines the priority level of the vehicle as "23". When recommender 15 obtains a call from an occupant of the vehicle, recommender 15 detects "occurrence of call", and determines the priority level of the vehicle as "18". When recommender 15 determines that the vehicle is located near a railroad crossing from the position information of the vehicle and the map information, recommender 15 detects "railroad crossing", and determines the priority level of the vehicle as "4".

In the case where each priority level in priority level table T1 is not a weighted value, in Step S202, the degree of request for monitoring by the monitor may be determined using weights. For example, the degree of request for monitoring by the monitor may be determined by multiplying the priority level corresponding to the situation information by a weight corresponding to the situation information. That is, the degree of request for monitoring by the monitor may be determined through computation. In this case, the weight is a value set beforehand.

The weights corresponding to the plurality of items of situation information may each be determined as appropriate according to, for example, the situation of the vehicle or the surroundings of the vehicle. Each weight may be determined according to information other than the situation information corresponding to the weight. An example of the other information is such information (e.g. the number of objects around the vehicle included in the vehicle information) that causes a change in the degree of request for monitoring by the monitor for the situation information (e.g. "pedestrian crossing") corresponding to the weight. That is, the other information is information that influences the degree of request for monitoring by the monitor in the situation information.

For example, for the situation information "pedestrian crossing" (an example of first situation information), the degree of request for monitoring by the monitor changes according to the number of objects around the vehicle (i.e. the number of surrounding objects). For example, when the number of surrounding objects (e.g. the number of persons) is larger, the running risk of the vehicle is higher (e.g. the accident occurrence rate is higher), and therefore the degree of request for monitoring by the monitor is higher. Hence, recommender 15 may assign a larger weight to "pedestrian crossing" when the number of surrounding objects is larger. The other information is not limited to the number of surrounding objects included in the vehicle information, and may be situation information (an example of second situation information, such as "sudden start") other than the situation information from among the plurality of items of situation information, the travel information, or a combination thereof. For example, in the case where a vehicle stopped near a pedestrian crossing starts to move, "sudden start" increases the running risk of the vehicle at the pedestrian crossing, and therefore the degree of request for monitoring by the monitor is higher. Hence, recommender 15 may assign a larger weight to "pedestrian crossing" in the case of "sudden start" than in the case of not "sudden start".

Thus, the plurality of items of situation information include the first situation information (e.g. "pedestrian crossing") and the second situation information (e.g. "sudden start") different from the first situation information. The weight corresponding to the first situation information may be determined according to at least one of the second situation information, the vehicle information, and the travel information.

The weights corresponding to the plurality of items of situation information may each be determined according to the time during which the monitor is not responding (e.g. not monitoring) from when the situation information is detected. Take the situation information "occurrence of call" as an example. The weight corresponding to the situation information "occurrence of call" may be determined according to the time (hereafter also referred to as "non-response time") during which the monitor is not responding to a call from the occupant of the vehicle from when the call is obtained by server device 10. For example, when the non-response time for "occurrence of call" is longer, the running risk of the vehicle is higher, and therefore the degree of request for monitoring by the monitor is higher. Hence, recommender 15 may assign a larger weight to "occurrence of call" when the non-response time for the call is longer.

The weights corresponding to the plurality of items of situation information may each be determined according to the difference from reference in the situation information. Take the situation information "time schedule slippage" as an example. The weight corresponding to the situation information "time schedule slippage" may be determined according to the time difference (e.g. the delay time from the travel plan) from the travel plan (an example of reference in situation information) set beforehand. For example, when the time difference from the travel plan is greater, the running risk of the vehicle is higher, and therefore the degree of request for monitoring by the monitor is higher. Hence, recommender 15 may assign a larger weight to "time schedule slippage" when the time difference from the travel plan is greater.

As another example of determining the weight according to the difference from the reference value in the situation information is the situation information "speed anomaly" (not illustrated). The weight corresponding to the situation information "speed anomaly" may be determined according to the speed difference from the legal speed (an example of reference in situation information) of the road on which the vehicle is running. For example, when the speed difference from the legal speed is greater, the running risk of the vehicle is higher, and therefore the degree of request for monitoring by the monitor is higher. Hence, recommender 15 may assign a larger weight to "speed anomaly" when the speed difference from the legal speed is greater. The legal speed is obtained, for example, based on the position information of the vehicle and the map information.

In Step S203, recommender 15 determines the monitoring priority level of the vehicle. Specifically, recommender 15 determines the priority level determined in Step S202, as the monitoring priority level of the vehicle. In the case where a plurality of items of situation information are detected for one vehicle in Step S202, i.e. a plurality of priority levels are determined for one vehicle, recommender 15 may calculate the monitoring priority level by performing predetermined computation on the plurality of priority levels. One monitoring priority level is determined for one vehicle. The computation includes at least one of addition, subtraction, multiplication, and division. For example, recommender 15 adds the plurality of priority levels together, to determine the monitoring priority level of the vehicle.

As described above, the monitoring priority level of each of vehicles M1, etc. is determined based on at least the vehicle information. The process in FIG. 13 is performed for each of the plurality of vehicles M1, etc.

Figure 14A:
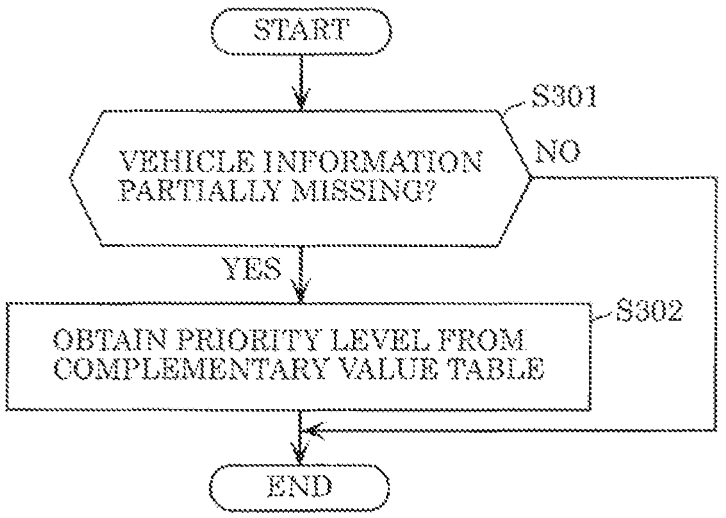
FIG. 14A is a flowchart illustrating an example of a process by the recommender according to the embodiment in the case where at least part of vehicle information of a vehicle cannot be obtained.
Figure 14B:
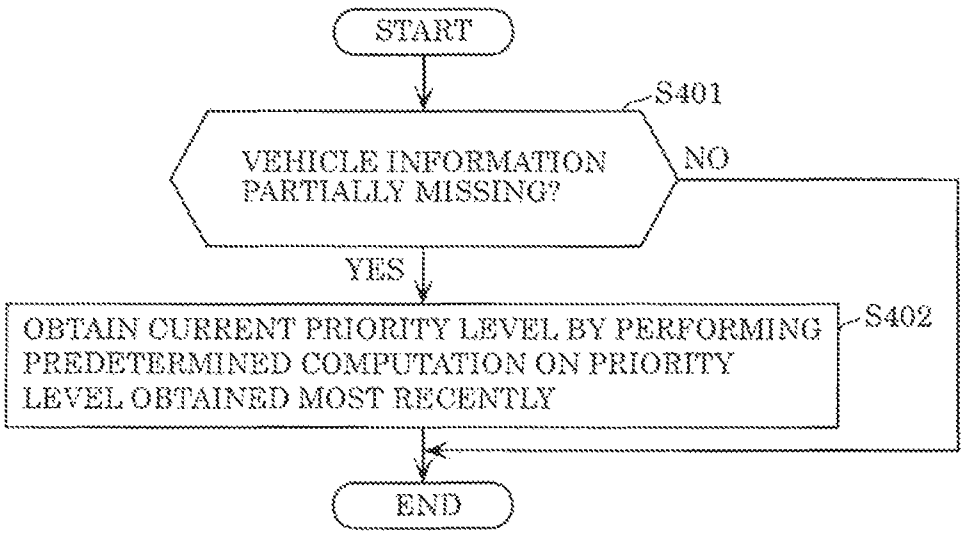
FIG. 14B is a flowchart illustrating another example of a process by the recommender according to the embodiment in the case where at least part of vehicle information of a vehicle cannot be obtained.

A process by recommender 15 in the case where at least part of the vehicle information and the travel information cannot be obtained will be described below, with reference to FIGS. 14A and 14B. FIGS. 14A and 14B illustrate the case where at least part of the vehicle information cannot be obtained.

FIG. 14A is a flowchart illustrating an example of a process by recommender 15 according to this embodiment in the case where at least part of the vehicle information of the vehicle cannot be obtained. FIG. 14B is a flowchart illustrating another example of a process by recommender 15 according to this embodiment in the case where at least part of the vehicle information of the vehicle cannot be obtained. The process in each of FIGS. 14A and 14B is a process performed between Steps S201 and S202 in FIG. 13.

As illustrated in FIG. 14A, in Step S301, recommender 15 determines whether part of the vehicle information from the vehicle is missing. That is, recommender 15 determines whether part of the vehicle information of the vehicle cannot be obtained. Examples of the case where part of the vehicle information cannot be obtained include the case where predetermined information (e.g. speed information) in the vehicle information cannot be obtained and the case where the information included in the obtained vehicle information differs between a plurality of vehicles.

In the case where recommender 15 determines that part of the vehicle information is missing (Step S301: Yes), the process advances to Step S302. Otherwise (Step S301: No), the process in the case where part of the vehicle information is missing ends. That is, recommender 15 performs the process in Step S202 using the vehicle information of the vehicle obtained in Step S201.

In Step S302, recommender 15 obtains the priority level of the situation information corresponding to the missing vehicle information from complementary value table T2. Specifically, recommender 15 reads, from complementary value table T2 in FIG. 5, the complementary value corresponding to the situation of the vehicle based on the vehicle information that cannot be obtained, and determines the read complementary value as the priority level corresponding to the situation information. The complementary value is determined based on the influence of not obtaining at least part of the vehicle information on the determination of the monitoring priority level. For example, in the case where the unobtained information is the position information, the influence is higher when the number of items of situation information based on the position information from among the plurality of items of situation information is larger. Therefore, for example, the complementary value of the situation information based on the position information may be set to be high. In the case where the unobtained information is the position information, the influence is higher when the priority level of the situation information based on the position information from among the plurality of items of situation information is higher. Therefore, for example, the complementary value of the situation information based on the position information may be set to be higher when the priority level of the situation information is higher.

As illustrated in FIG. 14B, in Step S401, recommender 15 determines whether part of the vehicle information from the vehicle is missing. That is, recommender 15 determines whether part of the vehicle information of the vehicle cannot be obtained. The process in Step S401 is the same as that in Step S301 in FIG. 14A, and accordingly its description is omitted. In the case where recommender 15 determines that part of the vehicle information is missing (Step S401: Yes), the process advances to Step S402. Otherwise (Step S401: No), the process in the case where part of the vehicle information is missing ends. That is, recommender 15 performs the process in Step S202 using the vehicle information of the vehicle obtained in Step S201.

In Step S402, recommender 15 obtains a current priority level by performing predetermined computation on a most recently obtained priority level. The predetermined computation may be to multiply the most recently obtained priority level by a predetermined correction coefficient. Travel DB 13 may store a correction coefficient table based on the influence caused as a result of at least part of the vehicle information not being obtained. Recommender 15 may then multiply the most recently obtained priority level in the situation information based also on the at least part of the vehicle information by the predetermined correction coefficient to perform correction, thus obtaining the current priority level of the situation information.

The current priority level is a priority level determined based on the vehicle information (an example of first vehicle information) obtained in Step S201. The most recently obtained priority level is a priority level determined based on the vehicle information (an example of second vehicle information) obtained earlier than the vehicle information obtained in Step S201. The vehicle information obtained earlier is information including the at least part of the vehicle information not obtained in Step S201. The most recently obtained priority level may be a priority level obtained immediately before the current time, or a statistical value such as a mean value, a median value, a maximum value, or a minimum value of a plurality of priority levels obtained most recently (e.g. most recently obtained five priority levels)

As described above, recommender 15 complements the degree of request for monitoring by the monitor for the at least part, based on the second vehicle information obtained earlier than the first vehicle information and including the at least part and the influence of not obtaining the at least part on the determination of the monitoring priority level. In the case where at least part of the first vehicle information is not obtained, recommender 15 may determine the degree of request for monitoring by the monitor according to the influence of not obtaining the at least part on the determination of the monitoring priority level, based on the second vehicle information obtained earlier than the first vehicle information and including the at least part. Recommender 15 may, for example, determine the degree of request for monitoring by the monitor, by complementing the first vehicle information. For example, in the case where vehicle speed cannot be obtained, recommender 15 may calculate the priority level by complementing the vehicle speed by previous vehicle speed or vehicle speed that takes into account its change with time.

In Step S402, recommender 15 may determine the degree of request for monitoring by the monitor according to the influence, based on the elapsed time from when the second vehicle information was obtained in the past. Recommender 15 may, for example, convert the correction coefficient according to the elapsed time from when the unobtained part of the vehicle information was most recently obtained to the current time. For example, recommender 15 may convert the correction coefficient to be higher (e.g. so that the priority level will be higher) when the elapsed time is longer.

Travel DB 13 may store a conversion table (not illustrated) for converting correction coefficients. Recommender 15 may then read the conversion table and multiply the most recently obtained priority level by a coefficient based on the read conversion table, to correct the most recently obtained priority level.

Recommender 15 may not perform the processes illustrated in FIGS. 14A and 14B.

Figure 15:
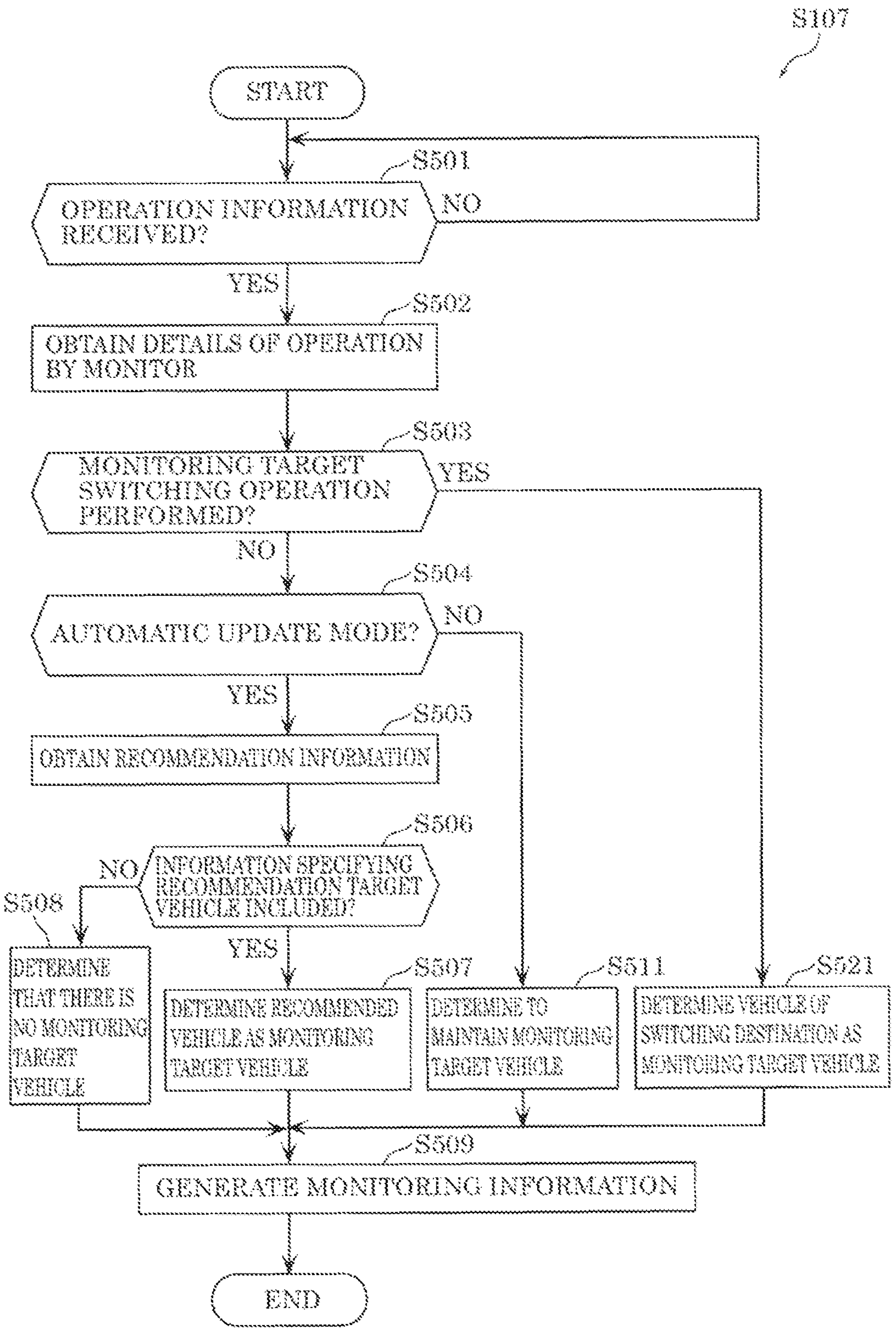
FIG. 15 is a flowchart illustrating a process by a monitoring controller according to the embodiment.

FIG. 15 is a flowchart illustrating a process by monitoring controller 17 according to this embodiment. FIG. 15 illustrates the details of the process in Step S107 in FIG. 12.

In Step S501, monitoring controller 17 determines whether receiver 16 receives operation information from input device 20. In the case where monitoring controller 17 determines that operation information is received (Step S501: Yes), the process advances to Step S502. Otherwise (Step S501: No), Step S501 is performed again. Thus, monitoring controller 17 is in a standby state in Step S501 until operation information is received.

In Step S502, monitoring controller 17 obtains operation by the monitor, based on the operation information received by receiver 16.

In Step S503, monitoring controller 17 determines whether monitoring target switching operation is performed. In the case where monitoring controller 17 determines that the operation is performed (Step S603: Yes), the process advances to Step S521. In the case where monitoring controller 17 determines that the operation is not performed (Step S503: No), the process advances to Step S504.

In Step S504, monitoring controller 17 determines whether the current operation mode is the automatic update mode. In the case where the current operation mode is the automatic update mode (Step S504: Yes), the process advances to Step S505. Otherwise (Step S504: No), the process advances to Step S511.

In Step S505, monitoring controller 17 obtains the recommendation information provided from recommender 15 in Step S104.

In Step S506, monitoring controller 17 determines whether the recommendation information includes information specifying a recommendation target vehicle. In the case where the recommendation information includes information specifying a recommendation target vehicle (S506: Yes), i.e. in the case where recommender 15 determines that there is a recommendation target vehicle, the process advances to Step S507. Otherwise (Step S506: No), the process advances to Step S508.

In Step S507, monitoring controller 17 determines the recommendation target vehicle recommended in the recommendation information, as a monitoring target vehicle.

In Step S508, monitoring controller 17 determines that there is no monitoring target vehicle, based on the recommendation information.

In Step S511, monitoring controller 17 determines to maintain the current monitoring target vehicle.

In Step S521, monitoring controller 17 determines the vehicle of the switching destination of the switching operation by the monitor, as the monitoring target vehicle.

In Step S509, monitoring controller 17 generates monitoring information indicating the monitoring target, based on the determination in Step S507, S508, S511, or S521. After the process in Step S509, the series of processes in FIG. 15 ends. The monitoring information generated in Step S509 is provided to video manager 18 and used in the process in Step S108.

Although the above describes the case where recommender 15 recommends a vehicle as a monitoring target, recommender 15 may further recommend how to monitor the vehicle. For example, "how to monitor the vehicle" includes: monitoring how fast the vehicle is running; and in which direction with respect to the vehicle monitoring is performed. In this case, the recommendation information includes not only information specifying the vehicle, but also information specifying how to monitor the vehicle. In the case where the monitoring information further includes information specifying a method of monitoring the vehicle, video manager 18 includes, in the presentation information, data corresponding to the monitoring method from among the image data and sensing data received by communicator 11 from the vehicle, to present the information to the monitor. More specifically, in the case of recommending, as the vehicle monitoring method, in which direction with respect to the vehicle monitoring is performed, video manager 18 may include, in the presentation information, an image obtained by a camera in the direction of the monitoring target from among one or more cameras in the vehicle.

Variation of Embodiment

An information processing method, etc. according to a variation will be described below, with reference to FIG. 16. The structure of a monitoring system according to this variation is the same as that in the embodiment, and accordingly its description is omitted.

Figure 16:
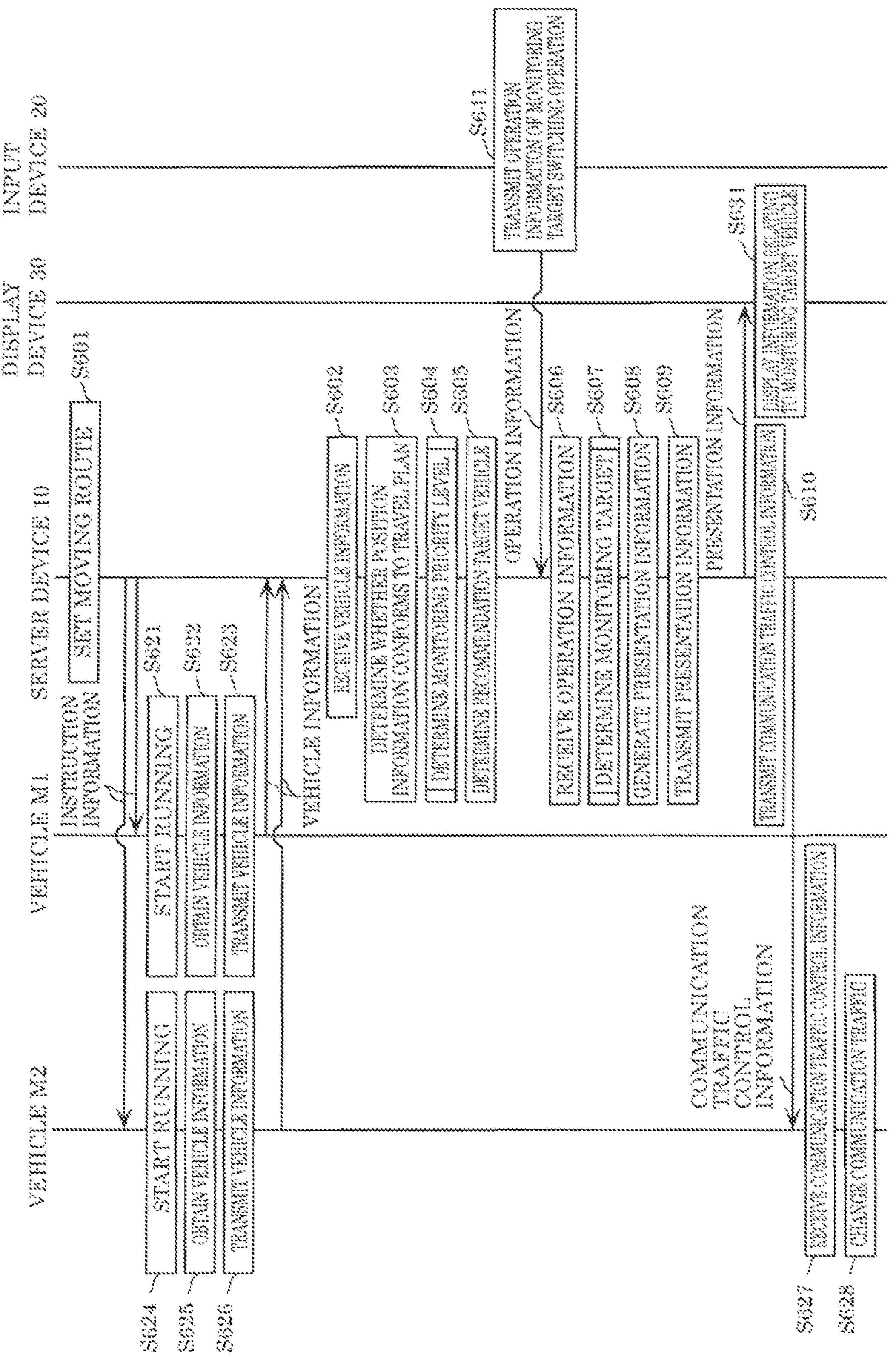
FIG. 16 is a sequence diagram illustrating a process by a monitoring system according to a variation of the embodiment.

FIG. 16 is a sequence diagram illustrating a process by monitoring system 1 according to this variation. Although vehicles M1 and M2 are used as an example of vehicles M1, etc. in FIG. 16, the same process is performed for the other vehicles. FIG. 16 illustrates an example in which server device 10 obtains vehicle information and the like from vehicles M1 and M2. Steps S601 to S609 performed by server device 10 are the same as Steps S101 to S109 in FIG. 12, and their description is omitted. Steps S621 to S623 performed by vehicle M1 and Steps S624 to S626 performed by vehicle M2 are the same as Steps S121 to S123 in FIG. 12, and their description is omitted. Step S631 performed by display device 30 is the same as Step S131 in FIG. 12, and its description is omitted. Step S641 performed by input device 20 is the same as Step S141 in FIG. 12, and its description is omitted. In the following description, it is assumed that vehicle M1 is determined as a monitoring target from among vehicles M1, etc. in Step S607.

In Step S610, server device 10 transmits communication traffic control information for controlling the communication traffic with a vehicle, to vehicle M2. That is, server device 10 transmits the communication traffic control information to vehicle M2 not determined as the monitoring target in Step S606. The communication traffic control information is information for reducing the communication traffic between vehicle M2 and server device 10.

The communication traffic between vehicle M2 and server device 10 is controlled according to the monitoring priority level. The monitoring priority level of vehicle M2 is lower than the monitoring priority level of vehicle M1. Accordingly, server device 10 may generate the communication traffic control information so that the communication traffic between vehicle M2 and server device 10 will be lower than the communication traffic between vehicle M1 and server device 10. Server device 10 may generate the communication traffic control information so that the communication traffic between vehicle M2 and server device 10 will be lower after the determination of the monitoring target than before the determination of the monitoring target.

In the case where vehicle M1 is determined as the monitoring target, the communication traffic control information is transmitted to all of the plurality of vehicles M1, etc. other than vehicle M1 (also referred to as "other vehicles"). The communication traffic control information transmitted to each of the other vehicles may be determined according to the monitoring priority level of the vehicle. Control may be performed so that the communication traffic of a vehicle low in monitoring priority level among the other vehicles will be lower than the communication traffic of a vehicle high in monitoring priority level among the other vehicles. Thus, while reducing the communication traffic between server device 10 and the other vehicles, more information can be transmitted for a vehicle having a high possibility of becoming a monitoring target hereafter from among the other vehicles. Alternatively, server device 10 may uniformly reduce the communication traffic of the other vehicles.

In Step S627, vehicle M2 receives the communication traffic control information.

In Step S628, vehicle M2 changes the communication traffic with server device 10 based on the received communication traffic control information. Vehicle M2 may reduce the communication traffic, by at least one of lowering the image quality of image data transmitted from vehicle M2, lowering the communication speed of transmitting image data, and lowering the frame rate for capturing image data. In the case where vehicle M2 includes two or more cameras for capturing the surroundings of vehicle M2, vehicle M2 may reduce the communication traffic by transmitting only image data captured by a predetermined camera to server device 10. The predetermined camera is, for example, a camera that is determined according to the moving route of vehicle M2 or the like and captures an image in the traveling direction of vehicle M2.

The process in Step S610 may be performed by any of the structural elements included in server device 10. For example, monitoring controller 17 or video manager 18 may perform the process in Step S610. For example, video manager 18 may transmit the communication traffic control information to vehicle M2 via communicator 11 after transmitting the presentation information to display device 30.

Other Embodiments

While the presently disclosed techniques have been described by way of the foregoing embodiment and variation (hereafter also referred to as "embodiment, etc."), the present disclosure is not limited to the foregoing embodiment, etc.

For example, although the foregoing embodiment, etc. describe an example in which a vehicle selected by operation by the monitor is determined as a monitoring target vehicle with priority over a recommendation target vehicle of the recommender, the present disclosure is not limited to this. The recommendation target may be determined as a monitoring target vehicle with priority over the vehicle selected by operation by the monitor. For example, the monitoring controller may preferentially determine the recommendation target vehicle as the monitoring target vehicle in the case where the monitoring priority level is higher than or equal to a predetermined value.

In the foregoing embodiment, etc., the recommender may read weights corresponding to the plurality of items of situation information from a table stored in the travel DB. That is, the travel DB may store a table in which the accident occurrence rate or the seriousness of an accident which can occur in each item of situation information is associated with a weight.

Although the foregoing embodiment, etc. describe an example in which the recommender determines a vehicle having the highest monitoring priority level or a monitoring priority level higher than or equal to the threshold as a recommendation target vehicle, the present disclosure is not limited to this. For example, the recommender may determine a vehicle for which predetermined situation information from among the plurality of items of situation information is detected, as a recommendation target vehicle. As an example, a vehicle for which the situation information "occurrence of accident of own vehicle" is detected may be determined as a recommendation target vehicle.

In the foregoing embodiment, etc., in the case where there are a plurality of monitors, the recommender may change each priority level or priority order depending on the state of each monitor. Take "occurrence of accident of own vehicle" illustrated in FIG. 4 as an example. Suppose monitor A handled "occurrence of accident of own vehicle" more times than monitor B in the past. In this case, monitor A can handle "occurrence of accident of own vehicle" more smoothly than monitor B. Hence, the priority level of monitor A for "occurrence of accident of own vehicle" may be higher than that of monitor B. Thus, in the case where there are a plurality of monitors, a monitor capable of smoothly handling a situation of situation information of the vehicle can monitor the vehicle.

In the foregoing embodiment, etc., each priority level in the priority level table may be determined, for example, using a machine learning model. The recommender may obtain a priority level for each item of situation information output as a result of inputting the obtained vehicle information and travel information to the machine learning model as input data, and determine recommendation information based on the obtained priority level.

In the foregoing embodiment, etc., the vehicle information (first vehicle information) includes a plurality of types. Each of the plurality of types of vehicle information may be associated with a weight. For example, each of steering angle and speed (an example of first vehicle information) may be associated with a weight. The monitoring priority level may then be determined based on the weight.

The method of communication between the devices in the monitoring system according to the foregoing embodiment, etc. is not limited. Communication between the devices may be wireless communication or wire communication. Communication between the devices may be a combination of wireless communication and wire communication.

The processing units (vehicle manager, travel manager, recommender, etc.) in the monitoring system according to the foregoing embodiment, etc. are typically implemented as LSI which is an integrated circuit. These processing units may be individually formed into one chip, or part or all thereof may be included in one chip.

The circuit integration technique is not limited to LSI, and dedicated circuits or general-purpose processors may be used to achieve the same. A field programmable gate array (FPGA) which can be programmed after manufacturing the LSI, or a reconfigurable processor where circuit cell connections and settings within the LSI can be reconfigured, may be used.

In the foregoing embodiment, etc., each of the structural elements may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk or semiconductor memory.

The numeric values described above are mere examples to illustrate the presently disclosed techniques in detail, and the present disclosure is not limited to such.

The division of the functional blocks in each block diagram is an example, and a plurality of functional blocks may be realized as one functional block, one functional block may be divided into a plurality of functional blocks, or part of functions may be transferred to another functional block. Moreover, functions of a plurality of functional blocks having similar functions may be realized by single hardware or software in parallel or in a time-sharing manner.

Although the foregoing embodiment, etc. describe the case where the server device is a single device, the server device may be implemented by a plurality of devices connected to each other.

The order in which the steps are performed in each flowchart is an example provided for specifically describing the presently disclosed techniques, and order other than the above may be used. Part of the steps may be performed simultaneously (in parallel) with other steps.

Other modifications obtained by applying various changes conceivable by a person skilled in the art to the foregoing embodiment, etc. and any combinations of the structural elements and functions in the foregoing embodiment, etc. without departing from the scope of the present disclosure are also included in the present disclosure.

Although only an exemplary embodiment of the present disclosure has been described in detail above, those skilled in the art will readily appreciate that many modifications are possible in the exemplary embodiment without materially departing from the novel teachings and advantages of the present disclosure. Accordingly, all such modifications are intended to be included within the scope of the present disclosure.

INDUSTRIAL APPLICABILITY

The presently disclosed techniques can be used for an information processing method whereby a monitor monitors an operated vehicle.

What is claimed is:

1. An information processing method performed using a computer, the information processing method comprising:

obtaining vehicle information from a vehicle that is driving automatically and is a monitoring target, the vehicle information indicating at least one of a running state and an external state of the vehicle; and causing a presentation device of an operator who remotely operates the vehicle to output presentation information for monitoring the vehicle, based on the vehicle information;

wherein the presentation information includes at least one of: first information indicating a reason why the vehicle is determined to be a monitoring target vehicle; second information on a monitoring method for the vehicle; and third information indicating that no monitoring is requested when there is no monitoring target vehicle, the information processing method further comprises:

determining a monitoring priority level of the vehicle based on the vehicle information;

generating the presentation information based on the monitoring priority level; and recording a time during which no monitoring is requested, the time during which no monitoring is requested being a time in which there is no vehicle having the monitoring priority level higher than or equal to a predetermined threshold, the presentation information includes at least the third information, and the third information includes statistical information of the time during which no monitoring is requested.

2. The information processing method according to claim 1, wherein the presentation information includes at least the first information, and the first information includes information indicating which one of a plurality of items of situation information is detected at the vehicle, the plurality of items of situation information each indicating a situation of the vehicle.

3. The information processing method according to claim 2, wherein the monitoring priority level of the vehicle is determined based on the vehicle information, the presentation information includes at least the first information, and the first information includes information indicating a contribution of at least one of the plurality of items of situation information to the monitoring priority level.

4. The information processing method according to claim 1, wherein the presentation information includes at least the first information, and the first information includes the monitoring priority level.

5. The information processing method according to claim 1, wherein the presentation information includes at least the second information, and the second information includes an image obtained by capturing a direction of monitoring on the vehicle by a monitor who remotely monitors the vehicle.

6. The information processing method according to claim 1, wherein the presentation information includes at least the second information, and the second information includes information recommending how to monitor the vehicle.

7. The information processing method according to claim 1, wherein the presentation information includes at least the third information, and the third information includes information indicating that there is no monitoring target vehicle.

8. The information processing method according to claim 1, wherein the presentation information is information obtained by superimposing, on an image, at least one of the first information, the second information, and the third information, and displaying the image.

9. The information processing method according to claim 1, wherein the first information includes at least one of the following: the vehicle which transmitted the vehicle information has had an accident; the vehicle has made a sudden start; an occupant of the vehicle has made a call; the vehicle is to pass a predetermined position; a deviation has occurred from a travel plan set in advance for the vehicle; and traffic congestion caused by the vehicle has occurred, when the monitoring method comprises recommending a direction of monitoring viewed from the vehicle, the second information includes an image obtained by a camera capturing the direction of monitoring of the monitoring target among a plurality of cameras of the vehicle, and the third information includes information for indicating that no monitoring is requested as text information.

10. An information processing system, comprising:

a processor; and memory, wherein, using the memory, the processor:

obtains vehicle information from a vehicle that is driving automatically and is a monitoring target, the vehicle information indicating at least one of a running state and an external state of the vehicle; and causes a presentation device of an operator who remotely operates the vehicle to output presentation information for monitoring the vehicle, based on the vehicle information;

the presentation information includes at least one of: first information indicating a reason why the vehicle is determined to be a monitoring target vehicle; second information on a monitoring method for the vehicle; and third information indicating that no monitoring is requested when there is no monitoring target vehicle, the processor further:

determines a monitoring priority level of the vehicle based on the vehicle information;

generates the presentation information based on the monitoring priority level; and records a time during which no monitoring is requested, the time during which no monitoring is requested being a time in which there is no vehicle having the monitoring priority level higher than or equal to a predetermined threshold, the presentation information includes at least the third information, and the third information includes statistical information of the time during which no monitoring is requested.

11. An information processing method performed using a computer, the information processing method comprising:

obtaining vehicle information from a vehicle that is driving automatically and is a monitoring target, the vehicle information indicating at least one of a running state and an external state of the vehicle; and causing a presentation device of an operator who remotely operates the vehicle to output presentation information for monitoring the vehicle, based on the vehicle information;

wherein the presentation information includes at least one of: first information indicating a reason why the vehicle is determined to be a monitoring target vehicle; second information on a monitoring method for the vehicle; and third information indicating that no monitoring is requested when there is no monitoring target vehicle, the information processing method further comprises:

determining a monitoring priority level of the vehicle based on the vehicle information; and recording a time during which no monitoring is requested, the time during which no monitoring is requested being a time in which there is no vehicle having the monitoring priority level higher than or equal to a predetermined threshold, and the third information includes information based on the time during which no monitoring is requested.

12. An information processing system, comprising:

a processor; and memory, wherein, using the memory, the processor:

obtains vehicle information from a vehicle that is driving automatically and is a monitoring target, the vehicle information indicating at least one of a running state and an external state of the vehicle; and causes a presentation device of an operator who remotely operates the vehicle to output presentation information for monitoring the vehicle, based on the vehicle information;

the presentation information includes at least one of: first information indicating a reason why the vehicle is determined to be a monitoring target vehicle; second information on a monitoring method for the vehicle; and third information indicating that no monitoring is requested when there is no monitoring target vehicle, the processor further:

determines a monitoring priority level of the vehicle based on the vehicle information; and records a time during which no monitoring is requested, the time during which no monitoring is requested being a time in which there is no vehicle having the monitoring priority level higher than or equal to a predetermined threshold, and the third information includes information based on the time during which no monitoring is requested.

* * * * *